US010356778B2

(12) United States Patent
Tseng et al.

(10) Patent No.: US 10,356,778 B2
(45) Date of Patent: Jul. 16, 2019

(54) FACILITATING DETECTION OF CONTROL CHANNELS WITH DIFFERENT TRANSMISSION TIME INTERVALS IN A WIRELESS COMMUNICATION SYSTEM

(71) Applicant: ASUSTeK COMPUTER INC., Taipei (TW)

(72) Inventors: Li-Chih Tseng, Taipei (TW); Ko-Chiang Lin, Taipei (TW); Ming-Che Li, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 3 days.

(21) Appl. No.: 15/594,250

(22) Filed: May 12, 2017

(65) Prior Publication Data
US 2017/0332377 A1 Nov. 16, 2017

Related U.S. Application Data

(60) Provisional application No. 62/335,517, filed on May 12, 2016.

(51) Int. Cl.
*H04W 72/04* (2009.01)
*H04W 24/00* (2009.01)
(Continued)

(52) U.S. Cl.
CPC ....... *H04W 72/0446* (2013.01); *H04W 24/00* (2013.01); *H04W 52/143* (2013.01);
(Continued)

(58) Field of Classification Search
CPC ... H04W 24/00; H04W 52/14; H04W 52/143; H04W 72/04; H04W 72/042;
(Continued)

(56) References Cited

U.S. PATENT DOCUMENTS 10,021,677 B2 * 7/2018 Mallik ................ H04W 72/042
10,103,856 B2 * 10/2018 Chen ..................... H04L 5/0048
(Continued)

FOREIGN PATENT DOCUMENTS

| CN | 104468030 A | 3/2015 |
|---|---|---|
| CN | 104871627 A | 8/2015 |

(Continued)

OTHER PUBLICATIONS

European Office Action and Extended Search Report for European Patent Application No. 17170834.0 dated Oct. 6, 2017, 11 pages.
(Continued)

*Primary Examiner* — Tri H Phan
(74) *Attorney, Agent, or Firm* — Amin, Turocy & Watson, LLP

(57) ABSTRACT

Facilitation detection of control channels with different transmission time intervals (TTIs) in wireless communications systems is described herein. In one example, a computer-implemented method comprises: monitoring, by a mobile device comprising a processor, a first control channel in the beginning of a first TTI; and receiving, by the mobile device, a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI. The computer-implemented method can also comprise determining, by the mobile device, whether to monitor the second control channel of the second TTI based on the information of the first DCI.

28 Claims, 23 Drawing Sheets

Figure 1:
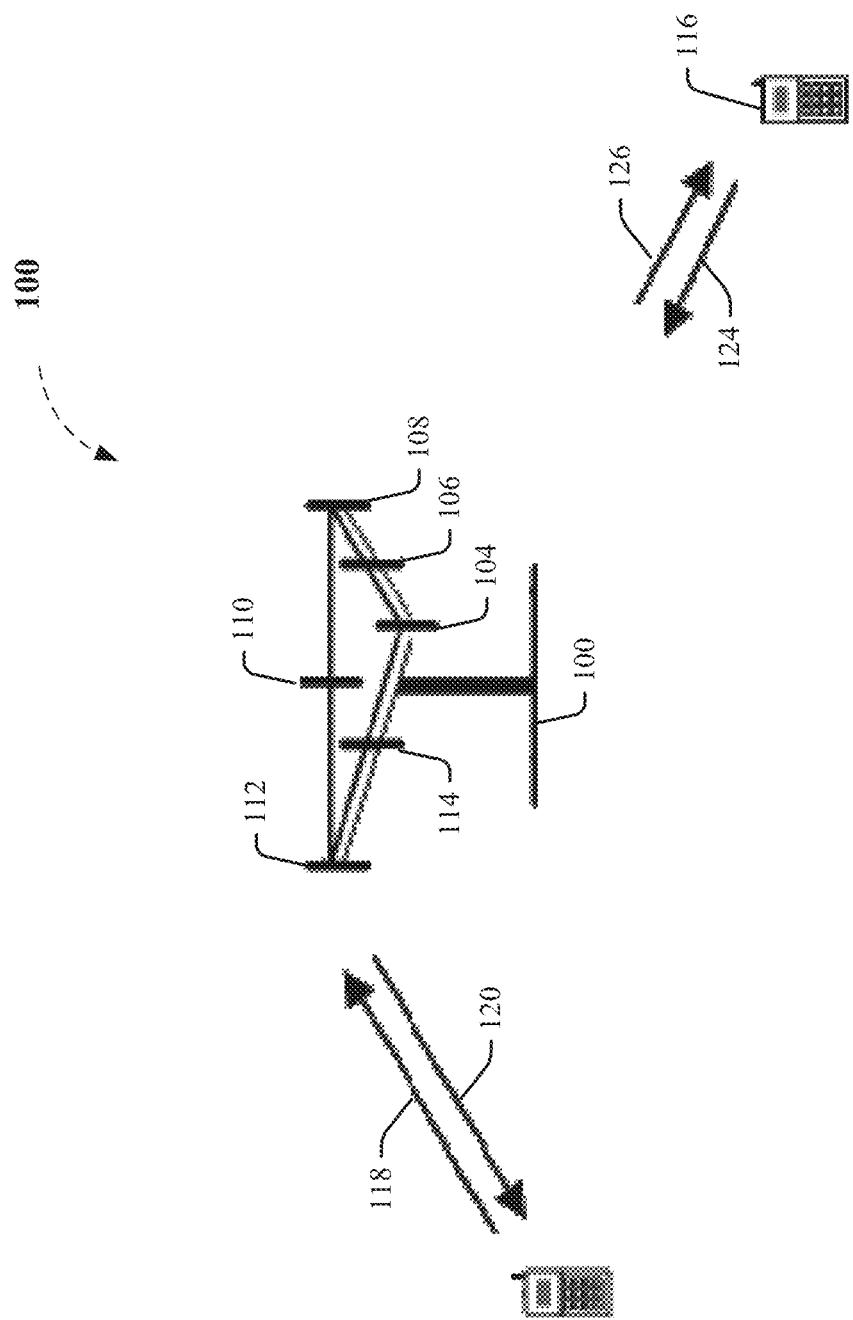

(51) Int. Cl.
  H04W 52/14 (2009.01)
  H04W 72/12 (2009.01)
  H04W 74/00 (2009.01)
(52) U.S. Cl.
  CPC ..... *H04W 72/042* (2013.01); *H04W 72/0413* (2013.01); *H04W 72/1289* (2013.01); *H04W 74/006* (2013.01)
(58) Field of Classification Search
  CPC ........ H04W 72/0413; H04W 72/0446; H04W 72/12; H04W 72/1289; H04W 74/00; H04W 74/006; H04L 5/0053
  See application file for complete search history.

(56) References Cited

U.S. PATENT DOCUMENTS

| | | | | |
|---|---|---|---|---|
| 2014/0204868 | A1* | 7/2014 | Lin | H04W 72/0406 370/329 |
| 2016/0128028 | A1 | 5/2016 | Mallik et al. | |
| 2016/0366682 | A1* | 12/2016 | Tseng | H04W 72/04 |
| 2017/0230994 | A1* | 8/2017 | You | H04W 72/042 |
| 2017/0289970 | A1* | 10/2017 | Yang | H04W 52/146 |
| 2017/0290008 | A1* | 10/2017 | Tooher | H04L 1/0007 |
| 2017/0290046 | A1* | 10/2017 | Sun | H04L 25/0202 |
| 2017/0332397 | A1* | 11/2017 | Li | H04L 1/1861 |
| 2018/0123769 | A1* | 5/2018 | Pelletier | H04L 5/001 |
| 2018/0234998 | A1* | 8/2018 | You | H04L 5/00 |
| 2018/0310283 | A1* | 10/2018 | Deenoo | H04W 72/042 |

FOREIGN PATENT DOCUMENTS

| | | |
|---|---|---|
| EP | 1594246 A2 | 11/2005 |
| EP | 2144379 A1 | 1/2010 |
| WO | 2016040290 A1 | 3/2016 |
| WO | 2016064039 A1 | 4/2016 |
| WO | 2017130990 A1 | 8/2017 |

OTHER PUBLICATIONS

"Downlink Control Signaling Design for Short TTI," 3GPP TSG RAN WG1 Meeting #84bis, Apr. 2016, R1-163322, Ericsson, Busan, Korea, 4 pages.
"DL Channel Design for Shortened TTI," 3GPP TSG RAN WG1 #84bis, Apr. 2016, R1-163068, Qualcomm Incorporated, Busan, Korea, 8 pages.
"Beam Forming Impacts," 3GPP TSG-RAN WG2 Meeting #93bis, Apr. 2016, R2-162366, Nokia, Alcatel-Lucent Shanghai Bell, Dubrovnik, Croatia, 3 pages.
"Discussion on terminology of beamforming based high frequency NR," 3GPP TSG-RAN WG2 Meeting #94, May 2016, R2-163716, Samsung, Nanjing, China, 4 pages.
"Beam support in NR," 3GPP TSG RAN WG2 Meeting #93bis, Apr. 2016, R2-162709, Intel Corporation, Dubrovnik, Croatia, 4 pages.
"Active Mode Mobility in NR: SINR drops in higher frequencies," 3GPP TSG-RAN WG2 #93bis, Apr. 2016, R2-162762, Ericsson, Dubrovnik, Croatia, 4 pages.
"Radio Access Architecture and Interfaces," 3rd Generation Partnership Project, Technical Specification Group Radio Access Network, Study on New Radio Access Technology, 3GPP TR 38.801, Apr. 2106, V0.1.0, Release 14, 17 pages.
"Summary of email discussion [93bis#23][NR] Deployment scenarios," 3GPP TSG-RAN WG2 #94, May 2016, R2-164306, Revision of R2-163399, NTT DOCOMO, INC., Nanjing, China, 18 pages.
"3GPP TDocs (written contributions) at meeting," Meeting: R2-94, May 2016, Nanjing, China, 38 pages. http://www.3gpp.org/DynaReport/TDocExMtg--R2-94-31668.htm.
"RAN2 Impacts in HF-NR," 3GPP TSG-RAN WG2 #94, May 2016, R2-163879, MediaTek Inc., Nanjing, China, 5 pages.
"Beam level management <-> Cell level mobility," 3GPP TSG-RAN WG2 Meeting #93bis, Apr. 2016, R2-162210, Samsung, Dubrovnik, Croatia, 4 pages.
"Cell concept in NR," 3GPP TSG RAN WG2 Meeting #94, May 2016, R2-163471, CATT, Nanjing, China, 4 pages.
"General considerations on LTE-NR tight interworking," 3GPP TSG-RAN WG2 Meeting #94, May 2016, R2-164270, Huawei, HiSilicon, Nanjing, China, 3 pages.
"RAN2 aspects of high frequency New RAT," 3GPP TSG-RAN WG2 Meeting #93bis, Apr. 2016, R2-162251, Samsung, Dubrovnik, Croatia, 8 pages.
"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.
"Mobility Supporting for HF-NR," 3GPP TSG-RAN WG2 #94, May 2016, R2-163484, MediaTek Inc., Nanjing, China, 6 pages.
"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall description, 3GPP TS 36.300, Mar. 2016, V13.3.0, 295 pages.
"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.
"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.
Ericsson, "SI: Study on Latency reduction techniques for LTE," 3GPP TSG RAN Meeting #67, Mar. 2015, RP-150465, Shanghai, China, 8 pages.
"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.
"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.
"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.
"DL Channel Design for Shortened TTI", 3GPP TSG RAN WG1 #84bis, Apr. 2016, R1-163068, Qualcomm Incorporated, Busan, Korea, 7 pages.
Japanese Office Action for Japanese Patent Application No. 2017-095316 dated Aug. 28, 2018, 12 pages (including English translation).
"Short-TTI PDCCH Design," 3GPP TSG RAN WG1 #84bis, Apr. 2016, R1-162963, InterDigital, Busan, Korea, 4 pages.
Korean Office Action for Korean Patent Application No. 10-2017-0059619 dated May 28, 2018, 11 pages (including English translation).
Taiwanese Office Action for Taiwanese Patent Application No. 106115880 dated Aug. 16, 2018, 42 pages (including English translation).

* cited by examiner

FACILITATING DETECTION OF CONTROL CHANNELS WITH DIFFERENT TRANSMISSION TIME INTERVALS IN A WIRELESS COMMUNICATION SYSTEM

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component can be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "mobile device," "terminal," "handset," "mobile device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Packet data latency can be an important metrics for performance evaluation. Reducing packet data latency improves the system performance. In 3GPP RP-150465, "New SI proposal: Study on Latency reduction techniques for LTE", Ericsson, Huawei, the study item aims to investigate and standardize techniques of latency reduction. According to this proposal, the objective of the study item is to study enhancements to the Evolved Universal Terrestrial Radio Access Network (E-UTRAN) radio system in order to significantly reduce the packet data latency over the LTE Uu air interface (e.g., the air interface between the mobile device and the base station device) for an active mobile device and significantly reduce the packet data transport round trip latency for mobile devices that have been inactive for a longer period (in connected state). The study area includes resource efficiency, including air interface capacity, battery lifetime, control channel resources, specification impact and technical feasibility. Both frequency division duplex (FDD) and time division duplex (TDD) modes are considered.

According to this proposal, two areas should be studied and documented: (1) Fast uplink access solutions—for active mobile devices and mobile devices that have been inactive a longer time, but are kept in radio resource control (RRC)connected, focus should be on reducing user plane latency for the scheduled uplink (UL) transmission and getting a more resource efficient solution with protocol and signaling enhancements, compared to the pre-scheduling solutions allowed by the standard today, both with and without preserving the current transmission time interval (TTI) length and processing time; and (2) TTI shortening and reduced processing times—to assess specification impact and study feasibility and performance of TTI lengths between 0.5 milliseconds (ms) and one orthogonal frequency division multiplexing (OFDM) symbol, taking into account impact on reference signals and physical layer control signaling.

TTI shortening and processing time reduction can be considered as an effective solution for reducing latency, as the time unit for transmission can be reduced e.g., from 1 ms (14 OFDM) symbol to 1~7 OFDM symbols and the delay caused by decoding can be reduced as well. On the other hand, reducing the length of TTI may also have significant impact to current system design as the physical channels are developed based on 1 ms structure.

For control channels, in LTE there are two types of control channel, one of them is physical downlink control channel (PDCCH), which is a wide band signal across whole system bandwidth and occupying the first several (e.g., 1~4) OFDM symbols of 1 ms subframe. The region occupied by PDCCH is usually named as control region, and the rest of the subframe is usually known as data region. A second type of control channel, Enhanced Physical downlink control channel (ePDCCH), occupies the data region in the time domain, while only part of the bandwidth in the frequency domain. More detail description can be found in the following quotation from 3GPP TS 36.213 v13.1.1, "E-UTRA Physical layer procedures (Release 13)" and 3GPP TR 36.211 V13.1.0, "E-UTRA Study on latency reduction techniques for LTE (Release 13)."

As stated in 3GPP TS 36.213 v13.1.1, "E-UTRA Physical layer procedures (Release 13)," in section 9.1.3 Control Format Indicator (CFI) assignment procedure:

PHICH duration is signaled by higher layers according to Table 6.9.3-1 in 3GPP TR 36.211 V13.1.0, "E-UTRA Study on latency reduction techniques for LTE (Release 13)." The duration signaled puts a lower limit on the size of the control region determined from the control format indicator (CFI). When $N_{RB}^{DL}>10$, if extended Physical Hybrid-ARQ Indicator Channel (PHICH) duration is indicated by higher layers then the mobile device shall assume that CFI is equal to PHICH duration. In subframes indicated by higher layers to decode physical multicast channel (PMCH), when $N_{RB}^{DL}>10$, a mobile device may assume that CFI is equal to the value of the higher layer parameter non-MBSFNregionLength [11].

As stated in 3GPP TR 36.211 V13.1.0, "E-UTRA Study on latency reduction techniques for LTE (Release 13)," section 6.7 Physical control format indicator channel:

The physical control format indicator channel carries information about the number of OFDM symbols used for transmission of PDCCHs in a subframe. The set of OFDM symbols possible to use for PDCCH in a subframe is given by Table 6.7-1.

TABLE 6.7-1

Number of OFDM symbols used for PDCCH

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

The mobile device may assume the PCFICH is transmitted when the number of OFDM symbols for PDCCH is greater than zero unless stated otherwise in [4, clause 12].

Section 6.2.4 Resource-element groups of 3GPP TR 36.211 V13.1.0, "E-UTRA Study on latency reduction techniques for LTE (Release 13)" states:

Resource-element groups are used for defining the mapping of control channels to resource elements. A resource-element group is represented by the index pair (k',l') of the resource element with the lowest index k in the group with all resource elements in the group having the same value of l. The set of resource elements (k, l) in a resource-element group depends on the number of cell-specific reference signals configured as described below with $l_0=n_{PRB} \cdot N_{sc}^{RB}$, $0 \leq n_{PRB} < N_{RB}^{DL}$. In the first OFDM symbol of the first slot in a subframe the two resource-element groups in physical resource block $n_{PRB}$ consist of resource elements (k,l=0) with $k=k_0+0, k_0+1, \ldots, k_0+5$ and $k=k_0+6, k_0+7, \ldots, k_0+11$, respectively. In the second OFDM symbol of the first slot in a subframe in case of one or two cell-specific reference signals configured, the three resource-element groups in physical resource block $n_{PRB}$ consist of resource elements (k,l=1) with k=$k_0$+0,$k_0$+1, . . . , $k_0$+3, k=$k_0$+4,$k_0$+5, . . . , $k_0$+7 and k=$k_0$+8, $k_0$+9, . . . , $k_0$+11, respectively. In the second OFDM symbol of the first slot in a subframe in case of four cell-specific reference signals configured, the two resource-element groups in physical resource block $n_{PRB}$ consist of resource elements (k,l=1) with k=$k_0$+0, $k_0$+1, . . . , $k_0$+5 and k=$k_0$+6, $k_0$+7, . . . , $k_0$+11, respectively. In the third OFDM symbol of the first slot in a subframe, the three resource-element groups in physical resource block $n_{PRB}$ consist of resource elements (k,l=2) with k=$k_0$+0,$k_0$+1,. . . , $k_0$+3, k=$k_0$+4, $k_0$+5,. . . , $k_0$+7 and k=$k_0$+8, $k_0$+9, . . . , $k_0$+11, respectively. In the fourth OFDM symbol of the first slot in a subframe in case of normal cyclic prefix, the three resource-element groups in physical resource block $n_{PRB}$ consist of resource elements (k,l=3) with k=$k_0$+0,$k_0$+1, . . . , $k_0$+3, k=$k_0$+4, $k_0$+5, . . . , $k_0$+7 and k=$k_0$+8, $k_0$+9, . . . , $k_0$+11, respectively. In the fourth OFDM symbol of the first slot in a subframe in case of extended cyclic prefix, the two resource-element groups in physical resource block $n_{PRB}$ consist of resource elements (k,l=3) with k=$k_0$+0, $k_0$+1, . . . , $k_0$+5 and k=$k_0$+6, $k_0$+7, . . . , $k_0$+11, respectively. Mapping of a symbol-quadruplet ⟨z(i), z(i+1), z(i+2), z(i+3)⟩ onto a resource-element group represented by resource-element (k',l') is defined such that elements z(i) are mapped to resource elements (k,l) of the resource-element group not used for cell-specific reference signals in increasing order of i and k. In case a single cell-specific reference signal is configured, cell-specific reference signals shall be assumed to be present on antenna ports 0 and 1 for the purpose of mapping a symbol-quadruplet to a resource-element group, otherwise the number of cell-specific reference signals shall be assumed equal to the actual number of antenna ports used for cell-specific reference signals. The mobile device shall not make any assumptions about resource elements assumed to be reserved for reference signals but not used for transmission of a reference signal. For frame structure type 3, if the higher layer parameter subframeStartPosition indicates 's07' and the downlink transmission starts in the second slot of a subframe, the above definition applies to the second slot of that subframe instead of the first slot.

Section 6.2.4AEnhanced Resource-Element Groups (EREGs) of 3GPP TR 36.211 V13.1.0, "E-UTRA Study on latency reduction techniques for LTE (Release 13)" states:

EREGs are used for defining the mapping of enhanced control channels to resource elements. There are 16 EREGs, numbered from 0 to 15, per physical resource block pair. Number all resource elements, except resource elements carrying DM-RS for antenna ports p={107,108,109,110} for normal cyclic prefix or p={107,108} for extended cyclic prefix, in a physical resource-block pair cyclically from 0 to 15 in an increasing order of first frequency, then time. All resource elements with number i in that physical resource-block pair constitutes EREG number i. For frame structure type 3, if the higher layer parameter subframeStartPosition indicates 's07' and the downlink transmission starts in the second slot of a subframe, the above definition applies to the second slot of that subframe instead of the first slot.

Section 6.8A Enhanced physical downlink control channel 6.8A.1 EPDCCH formats of 3GPP TR 36.211 V13.1.0, "E-UTRA Study on latency reduction techniques for LTE (Release 13)" states:

The enhanced physical downlink control channel (EPDCCH) carries scheduling assignments. An enhanced physical downlink control channel is transmitted using an aggregation of one or several consecutive enhanced control channel elements (ECCEs) where each ECCE consists of multiple enhanced resource element groups (EREGs), defined in clause 6.2.4A. The number of ECCEs used for one EPDCCH depends on the EPDCCH format as given by Table 6.8A.1-2 and the number of EREGs per ECCE is given by Table 6.8A.1-1.Both localized and distributed transmission is supported. An EPDCCH can use either localized or distributed transmission, differing in the mapping of ECCEs to EREGs and PRB pairs. A mobile device shall monitor multiple EPDCCHs as defined in 3GPP TS 36.213 [4]. One or two sets of physical resource-block pairs which a mobile device shall monitor for EPDCCH transmissions can be configured. All EPDCCH candidates in EPDCCH set $X_m$ use either only localized or only distributed transmission as configured by higher layers. Within EPDCCH set $X_m$ in subframe i, the ECCEs available for transmission of EPDCCHs are numbered from 0 to $N_{ECCE,m,i}-1$ and ECCE number n corresponds to: EREGs numbered (n mod $N_{ECCE}^{RB}$)+$jN_{ECCE}^{RB}$ in PRB index $\lfloor n/N_{ECCE}^{RB} \rfloor$ for localized mapping, and EREGs numbered $\lfloor n/N_{RB}^{X_m} \rfloor + jN_{ECCE}^{RB}$ in PRB indices $(n+j \max(1, N_{RB}^{X_m}/N_{EREG}^{ECCE})) \mod N_{RB}^{X_m}$ for distributed mapping, where j=0,1, . . . , $N_{EREG}^{ECCE}-1$, $N_{EREG}^{ECCE}$ is the number of EREGs per ECCE, and $N_{ECCE}^{RB}=16/N_{EREG}^{ECCE}$ is the number of ECCEs per resource-block pair. The physical resource-block pairs constituting EPDCCH set $X_m$ are in this paragraph assumed to be numbered in ascending order from 0 to $N_{RB}^{X_m}-1$.

TABLE 6.8A.1-1

Number of EREGs per ECCE, $N_{EREG}^{ECCE}$

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

TABLE 6.8A.1-2

Supported EPDCCH formats

Number of ECCEs for one EPDCCH, $N_{ECCE}^{EPDCCH}$

| EPDCCH format | Case A | | Case B | |
|---|---|---|---|---|
| | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Case A in Table 6.8A.1-2 is used when the conditions corresponding to case 1 in clause 9.1.4 of 3GPP TS 36.212 V13.1.0, "E-UTRA Multiplexing and channel coding (Release 13)" are satisfied, otherwise case B is used. The quantity $n_{EPDCCH}$ for a particular mobile device and referenced in 3GPP TS 36.212 V13.1.0, "E-UTRA Multiplexing and channel coding (Release 13)," is defined as the number of downlink resource elements (k,l) available for EPDCCH transmission in a physical resource-block pair configured for possible EPDCCH transmission of EPDCCH set $X_0$ and fulfilling all of the following criteria: they are part of any one of the 16 EREGs in the physical resource-block pair, and they are assumed by the mobile device not to be used for cell-specific reference signals, where the positions of the cell-specific reference signals are given by clause 6.10.1.2 with the number of antenna ports for and the frequency shift of cell-specific reference signals derived as described in clause 6.10.1.2 unless other values for these parameters are provided by clause 9.1.4.3 in 3GPP TS 36.212 V13.1.0, "E-UTRA Multiplexing and channel coding (Release 13)," and they are assumed by the mobile device not to be used for transmission of CSI reference signals, where the positions of the CSI reference signals are given by clause 6.10.5.2 with the configuration for zero power CSI reference signals obtained as described in clause 6.10.5.2 unless other values are provided by clause 9.1.4.3 in 3GPP TS 36.212 V13.1.0, "E-UTRA Multiplexing and channel coding (Release 13)," and with the configuration for non-zero power CSI reference signals obtained as described in clause 6.10.5.2, and for frame structure type 1 and 2, the index l in the first slot in a subframe fulfils $l \geq l_{EPDCCHStart}$ where $l_{EPDCCHStart}$ is given by clause 9.1.4.1 of 3GPP TS 36.212 V13.1.0, "E-UTRA Multiplexing and channel coding (Release 13)," and for frame structure type 3, if the higher layer parameter subframeStartPosition indicates 's07' and if the downlink transmission starts in the second slot of a subframe; the index l in the second slot in the subframe fulfils $l \geq l_{EPDCCHStart}$ where $l_{EPDCCHStart}$ is given by clause 7.1.6.4 3GPP TS 36.212 V13.1.0, "E-UTRA Multiplexing and channel coding (Release 13)"—otherwise the index l in the first slot in the subframe fulfils $l \geq l_{EPDCCHStart}$ where $l_{EPDCCHStart}$ is given by clause 7.6.1.4 of 3GPP TS 36.212 V13.1.0, "E-UTRA Multiplexing and channel coding (Release 13)."

Downlink control information (DCI) would be carried on control channel, e.g., PDCCH/ePDCCH. Downlink control information can be used to carry scheduling for downlink data or uplink data. Downlink control information may also be used carry special messages, e.g., triggering some procedure or control mobile device power, from eNB to the UE. Several different DCI formats exist to serve the above different purposes. Taking downlink data scheduling as an example, DCI for downlink data scheduling may comprise the resource allocation(in the frequency domain), modulation and coding scheme, redundancy version, HARQ process ID, and other information require to perform the reception.

More detail example can be found in the below quotation from 3GPP TS 36.212 V13.1.0, "E-UTRA Multiplexing and channel coding (Release 13)":

5.3.3.1.5D Format 2D

The following information is transmitted by means of the DCI format 2D: Carrier indicator—0 or 3 bits. The field is present according to the definitions in [3]. Resource allocation header (resource allocation type 0/type 1)—1 bit as defined in section 7.1.6 of [3]. If downlink bandwidth is less than or equal to 10 PRBs, there is no resource allocation header and resource allocation type 0 is assumed. Resource block assignment: For resource allocation type 0 as defined in section 7.1.6.1 of [3] $\lceil N_{RB}^{DL}/P \rceil$ bits provide the resource allocation. For resource allocation type 1 as defined in section 7.1.6.2 of [3]; $\lceil \log_2(P) \rceil$ bits of this field are used as a header specific to this resource allocation type to indicate the selected resource blocks subset; 1 bit indicates a shift of the resource allocation span; $-(\lceil N_{RB}^{DL}/P \rceil - \lceil \log_2(P) \rceil -1)$ bits provide the resource allocation, where the value of P depends on the number of DL resource blocks as indicated in section [7.1.6.1] of [3]; TPC command for PUCCH—2 bits as defined in section 5.1.2.1 of [3]; Downlink Assignment Index—number of bits as specified in Table 5.3.3.1.2-2; HARQ process number—3 bits (for cases with FDD primary cell), 4 bits (for cases with TDD primary cell); Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of [2], or 4 bits as specified in Table 5.3.3.1.5C-2 where $n_{SCID}$ is the scrambling identity for antenna ports 7, 8, 11 and 13 defined in section 6.10.3.1 of [2] when higher layer parameter dmrs-tableAlt is set to 1. SRS request—[0-1] bit. This field can only be present for TDD operation and if present is defined in section 8.2 of [3]. In addition, for transport block 1: Modulation and coding scheme—5 bits as defined in section 7.1.7 of [3]; New data indicator—1 bit; Redundancy version—2 bits. In addition, for transport block 2: Modulation and coding scheme—5 bits as defined in section 7.1.7 of [3]; New data indicator—1 bit; Redundancy version—2 bits; PDSCH RE Mapping and Quasi-Co-Location Indicator—2 bits as defined in sections 7.1.9 and 7.1.10 of [3]; HARQ-ACK resource offset (this field is present when this format is carried by EPDCCH. This field is not present when this format is carried by PDCCH)—2 bits as defined in section 10.1 of [3]. The 2 bits are set to 0 when this format is carried by EPDCCH on a secondary cell, or when this format is carried by EPDCCH on the primary cell scheduling PDSCH on a secondary cell and the mobile device is configured with PUCCH format 3 for HARQ-ACK feedback.

If both transport blocks are enabled; transport block 1 is mapped to codeword 0; and transport block 2 is mapped to codeword 1. In case one of the transport blocks is disabled; the transport block to codeword mapping is specified according to Table 5.3.3.1.5-2. For the single enabled codeword, Value=4, 5, 6 in Table 5.3.3.1.5C-1 are only supported for retransmission of the corresponding transport block if that transport block has previously been transmitted using two, three or four layers, respectively. If the number of information bits in format 2D carried by PDCCH belongs to one of the sizes in Table 5.3.3.1.2-1, one zero bit shall be appended to format 2D.

Since different DCI formats may have different payload sizes and mobile device may need to acquire different DCI formats, mobile device need to decode several decoding candidates without knowing which or whether candidate exist. It is known as blind decoding. The resource of decoding candidate(s) is known as a search space of a UE. The search space is further partition to common search space and mobile device specific search space which may contain different type of messages. Within search space, mobile device may search for different DCI format. Also, within search space, mobile device would monitor control channel addressed different identifier, e.g., Radio Network Temporary Identifier (RNTI), which is done by descrambling CRC of a decoding candidate with different RNTI and check which one would pass the check. Following are related procedure quoted from 3GPP TS 36.213 v13.1.1, "E-UTRA Physical layer procedures (Release 13)" and 3GPP TS 36.212 V13.1.0, "E-UTRA Multiplexing and channel coding (Release 13)":

9.1.1 PDCCH Assignment Procedure

The control region of each serving cell consists of a set of CCEs, numbered from 0 to $N_{CCE,k}-1$ according to subclause 6.8.1 in [3], where $N_{CCE,k}$ is the total number of CCEs in the control region of subframe k. The mobile device shall monitor a set of PDCCH candidates on one or more activated serving cells as configured by higher layer signalling for control information, where monitoring implies attempting to decode each of the PDCCHs in the set according to all the monitored DCI formats. A BL/CE mobile device is not required to monitor PDCCH. The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined below, i=0, . . . , L−1. For the common search space m'=m. For the PDCCH mobile device specific search space, for the serving cell on which PDCCH is monitored, if the monitoring mobile device is configured with carrier indicator field then m'=m+ $M^{(L)} \cdot n_{CI}$ where $n_{CI}$ is the carrier indicator field value, else if the monitoring mobile device is not configured with carrier indicator field then m'=m, where m= 0, . . . , $M^{(L)}-1$. $M^{(L)}$ is the number of PDCCH candidates to monitor in the given search space. If a mobile device is configured with higher layer parameter cif-InSchedulingCell-r13, the carrier indicator field value corresponds to cif-InSchedulingCell-r13, otherwise, the carrier indicator field value is the same as ServCellIndex given in [11]. The mobile device shall monitor one common search space in every non-DRX subframe at each of the aggregation levels 4 and 8 on the primary cell. A mobile device shall monitor common search space on a cell to decode the PDCCHs necessary to receive MBMS on that cell when configured by higher layers. If a mobile device is not configured for EPDCCH monitoring, and if the mobile device is not configured with a carrier indicator field, then the mobile device shall monitor one PDCCH UE-specific search space at each of the aggregation levels 1, 2, 4, 8 on each activated serving cell in every non-DRX subframe. If a mobile device is not configured for EPDCCH monitoring, and if the mobile device is configured with a carrier indicator field, then the mobile device shall monitor one or more UE-specific search spaces at each of the aggregation levels 1, 2, 4, 8 on one or more activated serving cells as configured by higher layer signalling in every non-DRX subframe. If a mobile device is configured for EPDCCH monitoring on a serving cell, and if that serving cell is activated, and if the mobile device is not configured with a carrier indicator field, then the mobile device shall monitor one PDCCH UE-specific search space at each of the aggregation levels 1, 2, 4, 8 on that serving cell in all non-DRX subframes where EPDCCH is not monitored on that serving cell. If a mobile device is configured for EPDCCH monitoring on a serving cell, and if that serving cell is activated, and if the mobile device is configured with a carrier indicator field, then the mobile device shall monitor one or more PDCCH UE-specific search spaces at each of the aggregation levels 1, 2, 4, 8 on that serving cell as configured by higher layer signalling in all non-DRX subframes where EPDCCH is not monitored on that serving cell. The common and PDCCH UE-specific search spaces on the primary cell may overlap. A mobile device configured with the carrier indicator field associated with monitoring PDCCH on serving cell c shall monitor PDCCH configured with carrier indicator field and with CRC scrambled by C-RNTI in the PDCCH mobile device specific search space of serving cell c. A mobile device configured with the carrier indicator field associated with monitoring PDCCH on the primary cell shall monitor PDCCH configured with carrier indicator field and with CRC scrambled by SPS C-RNTI in the PDCCH mobile device specific search space of the primary cell. The mobile device shall monitor the common search space for PDCCH without carrier indicator field. For the serving cell on which PDCCH is monitored, if the mobile device is not configured with a carrier indicator field, it shall monitor the PDCCH mobile device specific search space for PDCCH without carrier indicator field, if the mobile device is configured with a carrier indicator field it shall monitor the PDCCH mobile device specific search space for PDCCH with carrier indicator field. If the mobile device is not configured with a LAA Scell, the mobile device is not expected to monitor the PDCCH of a secondary cell if it is configured to monitor PDCCH with carrier indicator field corresponding to that secondary cell in another serving cell. If the mobile device is configured with a LAA Scell, the mobile device is not expected to monitor the PDCCH mobile device specific space of the LAA SCell if it is configured to monitor PDCCH with carrier indicator field corresponding to that LAA Scell in another serving cell, where the mobile device is not expected to be configured to monitor PDCCH with carrier indicator field in an LAA Scell; where the mobile device is not expected to be scheduled with PDSCH starting in the second slot in a subframe in an LAA Scell if the mobile device is configured to monitor PDCCH with carrier indicator field corresponding to that LAA Scell in another serving cell. For the serving cell on which PDCCH is monitored, the mobile device shall monitor PDCCH candidates at least for the same serving cell. A mobile device configured to monitor PDCCH candidates with CRC scrambled by C-RNTI or SPS C-RNTI with a common payload size and with the same first CCE index $n_{CCE}$ (as described in subclause 10.1) but with different sets of DCI information fields as defined in [4] in the common search space PDCCH mobile device specific search space on the primary cell shall assume that for the PDCCH candidates with CRC scrambled by C-RNTI or SPS C-RNTI, if the mobile device is configured with the carrier indicator field associated with monitoring the PDCCH on the primary cell, only the PDCCH in the common search space is transmitted by the primary cell; otherwise, only the PDCCH in the mobile device specific search space is transmitted by the primary cell. A mobile device configured to monitor PDCCH candidates in a given serving cell with a given DCI format size with CIF, and CRC scrambled by C-RNTI, where the PDCCH candidates may have one or more possible values of CIF for the given DCI format size, shall assume that a PDCCH candidate with the given DCI format size can be transmitted in the given serving cell in any PDCCH mobile device specific search space corresponding to any of the possible values of CIF for the given DCI format size. If a serving cell is a LAA Scell, and if the higher layer parameter subframeStartPosition for the Scell indicates 's07', The mobile device monitors PDCCH UE-specific search space candidates on the Scell in both the first and second slots of a subframe, and the aggregation levels defining the search spaces are listed in Table 9.1.1-1A; otherwise, the aggregation levels defining the search spaces are listed in Table 9.1.1-1. If a serving cell is a LAA Scell, the mobile device may receive PDCCH with DCI CRC scrambled by CC-RNTI as described in subclause 13A on the LAA Scell. The DCI formats that the mobile device shall monitor depend on the configured transmission mode per each serving cell as defined in subclause 7.1. If a mobile device is configured with higher layer parameter skipMonitoringDCI-format0-1A for a serving cell, the mobile device is not required to monitor the PDCCH with DCI Format 0/1A in the mobile device specific search space for that serving cell. If a mobile device is configured with higher layer parameter pdcch-candidateReductions for a mobile device specific search space at aggregation level L for a serving cell, the corresponding number of PDCCH candidates is given by $M^{(L)}$=round $(a \times M_{full}^{(L)})$, where the value of a is determined according to Table 9.1.1-2 and $M_{full}^{(L)}$ is determined according to Table 9.1.1-1 by replacing $M^{(L)}$ with $M_{full}^{(L)}$.

TABLE 9.1.1-1

PDCCH candidates monitored by a UE

| | Search space $S_k^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

TABLE 9.1.1-1A

PDCCH UE-specific search space candidates monitored by a mobile device on LAA Scell

| | Search space $S_k^{(L)}$ | | Number of PDCCH candidates $M^{(L)}$ in first slot | Number of PDCCH candidates $M^{(L)}$ in second slot |
|---|---|---|---|---|
| Type | Aggregation level L | Size [in CCEs] | | |
| UE-specific | 1 | 6 | 6 | 6 |
| | 2 | 12 | 6 | 6 |
| | 4 | 8 | 2 | 2 |
| | 8 | 16 | 2 | 2 |

TABLE 9.1.1-2

Scaling factor for PDCCH candidates reduction

| pdcch-candidateReductions | Value of a |
|---|---|
| 0 | 0 |
| 1 | 0.33 |
| 2 | 0.66 |
| 3 | 1 |

For the common search spaces, $Y_k$ is set to 0 for the two aggregation levels L=4 and L=8. For the UE-specific search space $S_k^{(L)}$ at aggregation level L, the variable $Y_k$ is defined by $Y_k = (A \cdot Y_{k-1}) \bmod D$ where $T_{-1}=n_{RNTI} \neq 0$, A=39827, D=65537 and k=$\lfloor n_s/2 \rfloor$, $n_s$ is the slot number within a radio frame. The RNTI value used for $n_{RNTI}$ is defined in subclause 7.1 in downlink and subclause 8 in uplink.

9.1.4 EPDCCH Assignment Procedure

For each serving cell, higher layer signalling can configure a mobile device with one or two EPDCCH-PRB-sets for EPDCCH monitoring. The PRB-pairs corresponding to an EPDCCH-PRB-set are indicated by higher layers as described in subclause 9.1.4.4. Each EPDCCH-PRB-set consists of set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. The mobile device shall monitor a set of EPDCCH candidates on one or more activated serving cells as configured by higher layer signalling for control information, where monitoring implies attempting to decode each of the EPDCCHs in the set according to the monitored DCI formats. A BL/CE mobile device is not required to monitor EPDCCH. The set of EPDCCH candidates to monitor are defined in terms of EPDCCH UE-specific search spaces. For each serving cell, the subframes in which the mobile device monitors EPDCCH UE-specific search spaces are configured by higher layers. The mobile device shall not monitor EPDCCH For TDD and normal downlink CP, in special subframes for the special subframe configurations 0 and 5 shown in Table 4.2-1 of [3]. For TDD and extended downlink CP, in special subframes for the special subframe configurations 0, 4 and 7 shown in Table 4.2-1 of [3]. In subframes indicated by higher layers to decode PMCH. For TDD and if the mobile device is configured with different UL/DL configurations for the primary and a secondary cell, in a downlink subframe on the secondary cell when the same subframe on the primary cell is a special subframe and the mobile device is not capable of simultaneous reception and transmission on the primary and secondary cells. An EPDCCH UE-specific search space $ES_k^{(L)}$ at aggregation level L∈ {1,2,4,8,16,32} is defined by a set of EPDCCH candidates. For an EPDCCH-PRB-set p, the ECCEs corresponding to EPDCCH candidate m of the search space $ES_k^{(L)}$ are given by $$L\left\{\left(Y_{p,k} + \left\lfloor \frac{m \cdot N_{ECCE,p,k}}{L \cdot M_p^{(L)}} \right\rfloor \right) + b\right) \bmod \lfloor N_{ECCE,p,k}/L \rfloor\right\} + i$$

where $y_{p,k}$ is defined below, i=0, . . . , L−1 b=$n_{CI}$ if the mobile device is configured with a carrier indicator field for the serving cell on which EPDCCH is monitored, otherwise b=0 $n_{CI}$ is the carrier indicator field value, m=0,1, . . . $M_p^{(L)}$−1, If the mobile device is not configured with a carrier indicator field for the serving cell on which EPDCCH is monitored, $M_p^{(L)}$ is the number of EPDCCH candidates to monitor at aggregation level L in EPDCCH-PRB-set p for the serving cell on which EPDCCH is monitored; otherwise, $M_p^{(L)}$ is the number of EPDCCH candidates to monitor at aggregation level L in EPDCCH-PRB-set p for the serving cell indicated by $n_{CI}$. If a mobile device is configured with higher layer parameter pdcch-candidateReductions for a specific search space at aggregation level L in EPDCCH-PRB-set p for a serving cell, the corresponding number of EPDCCH candidates is given by $M_p^{(L)}$=round (a×$M_{p,full}^{(L)}$), where the value of a is determined according to Table 9.1.1-2 and $M_{p,full}^{(L)}$ is determined according to Tables 9.1.4-1a to 9.1.4-5b by replacing $M_p^{(L)}$ with $M_{p,full}^{(L)}$. If a mobile device is configured with higher layer parameter cif-InSchedulingCell-r13, the carrier indicator field value corresponds to cif-InSchedulingCell-r13, otherwise the carrier indicator field value is the same as ServCellIndex given in [11]. A mobile device is not expected to monitor an EPDCCH candidate, if an ECCE corresponding to that EPDCCH candidate is mapped to a PRB pair that overlaps in frequency with a transmission of either PBCH or primary or secondary synchronization signals in the same subframe. If a mobile device is configured with two EPDCCH-PRB-sets with the same $n_{ID,i}^{EPDCCH}$ value (where $n_{ID,i}^{EPDCCH}$ is defined in subclause 6.10.3A.1 in [3]), if the mobile device receives an EPDCCH candidate with a given DCI payload size corresponding to one of the EPDCCH-PRB-sets and mapped only to a given set of REs (as described in subclause 6.8A.5 in [3]), and if the mobile device is also configured to monitor an EPDCCH candidate with the same DCI payload size and corresponding to the other EPDCCH-PRB-set and which is mapped only to the same set of REs, and if the number of the first ECCE of the received EPDCCH candidate is used for determining PUCCH resource for HARQ-ACK transmission (as described in subclause 10.1.2 and subclause 10.1.3), the number of the first ECCE shall be determined based on EPDCCH-PRB-set p=0. The variable $y_{p,k}$ is defined by $$Y_{p,k}=(A_p \cdot Y_{p,k-1}) \bmod D$$

where $Y_{p,-1}=n_{RNTI} \neq 0$, $A_0=39827$, $A_1=39829$, D=65537 and k=$\lfloor n_s/2 \rfloor$, $n_s$ is the slot number within a radio frame. The RNTI value used for $n_{RNTI}$ is defined in subclause 7.1 in downlink and subclause 8 in uplink. The DCI formats that the mobile device shall monitor depend on the configured transmission mode per each serving cell as defined in subclause 7.1.

If a mobile device is configured with higher layer parameter skipMonitoringDCI-format0-1A for a serving cell, the mobile device is not required to monitor the EPDCCH with DCI Format 0/1A in the mobile device specific search space for that serving cell. If a serving cell is a LAA Scell, and if the higher layer parameter subframeStartPosition for the Scell indicates 's07'—the mobile device monitors EPDCCH UE-specific search space candidates on the Scell assuming they start in both the first slot and the second slot of a subframe. The aggregation levels defining the search spaces and the number of monitored EPDCCH candidates is given as follows: For a mobile device configured with only one EPDCCH-PRB-set for distributed transmission, the aggregation levels defining the search spaces and the number of monitored EPDCCH candidates are listed in Table 9.1.4-1a, Table 9.1.4-1b. For a mobile device configured with only one EPDCCH-PRB-set for localized transmission, the aggregation levels defining the search spaces and the number of monitored EPDCCH candidates are listed in Table 9.1.4-2a, Table 9.1.4-2b. For a mobile device configured with two EPDCCH-PRB-sets for distributed transmission, the aggregation levels defining the search spaces and the number of monitored EPDCCH candidates are listed in Table 9.1.4-3a, 9.1.4-3b. For a mobile device configured with two EPDCCH-PRB-sets for localized transmission, the aggregation levels defining the search spaces and the number of monitored EPDCCH candidates are listed in Table 9.1.4-4a, 9.4.4-4b. For a mobile device configured with one EPDCCH-PRB-set for distributed transmission, and one EPDCCH-PRB-set for localized transmission, the aggregation levels defining the search spaces and the number of monitored EPDCCH candidates are listed in Table 9.1.4-5a, 9.1.4-5b. If the mobile device is not configured with a carrier indicator field for the serving cell on which EPDCCH is monitored, $\hat{N}_{RB}^{DL}=N_{RB}^{DL}$ of the serving cell on which EPDCCH is monitored. If the mobile device is configured with a carrier indicator field for the serving cell on which EPDCCH is monitored, $\hat{N}_{RB}^{DL}=N_{RB}^{DL}$ of the serving cell indicated by $n_{CI}$.

Section 7.1 UE procedure for receiving the physical downlink shared channel of 3GPP TS 36.213 v13.1.1, "E-UTRA Physical layer procedures (Release 13)" states:

Except the subframes indicated by the higher layer parameter mbsfn-SubframeConfigList or by mbsfn-SubframeConfigList-v12x0 or by laa-SCellSubframeConfig of serving cell c, a mobile device shall: upon detection of a PDCCH of the serving cell with DCI format 1, 1A, 1B, 1C, 1D, 2, 2A, 2B, 2C, or 2D intended for the mobile device in a subframe, or upon detection of an EPDCCH of the serving cell with DCI format 1, 1A, 1B, 1D, 2, 2A, 2B, 2C, or 2D intended for the mobile device in a subframe decode the corresponding PDSCH in the same subframe with the restriction of the number of transport blocks defined in the higher layers . . . . If a mobile device is configured by higher layers to decode PDCCH with CRC scrambled by the SI-RNTI, the mobile device shall decode the PDCCH and the corresponding PDSCH according to any of the combinations defined in Table 7.1-1. The scrambling initialization of PDSCH corresponding to these PDCCHs is by SI-RNTI.

TABLE 7.1-1

PDCCH and PDSCH configured by SI-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2). |

TABLE 7.1-1-continued

PDCCH and PDSCH configured by SI-RNTI

| DCI format | Search Space | Transmission scheme of PDSCH corresponding to PDCCH |
|---|---|---|
| DCI format 1A | Common | If the number of PBCH antenna ports is one, Single-antenna port, port 0 is used (see subclause 7.1.1), otherwise Transmit diversity (see subclause 7.1.2). |

If a mobile device is configured by higher layers to decode PDCCH with CRC scrambled by the P-RNTI, the mobile device shall decode the PDCCH and the corresponding PDSCH according to any of the combinations defined in Table 7.1-2. The scrambling initialization of PDSCH corresponding to these PDCCHs is by P-RNTI. If a mobile device is configured by higher layers to decode MPDCCH with CRC scrambled by the P-RNTI, the mobile device shall decode the MPDCCH and any corresponding PDSCH according to any of the combinations defined in Table 7.1-2A. The scrambling initialization of PDSCH corresponding to these MPD-CCHs is by P-RNTI.

The mobile device is not required to monitor PDCCH with CRC scrambled by the P-RNTI on the PSCell.

TABLE 7.1-2

PDCCH and PDSCH configured by P-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |
| DCI format 1A | Common | If the number of PBCH antenna ports is one, Single-antenna port, port 0 is used (see subclause 7.1.1), otherwise Transmit diversity (see subclause 7.1.2) |

If a mobile device is configured by higher layers to decode PDCCH with CRC scrambled by the RA-RNTI, the mobile device shall decode the PDCCH and the corresponding PDSCH according to any of the combinations defined in Table 7.1-3. The scrambling initialization of PDSCH corresponding to these PDCCHs is by RA-RNTI.

If a mobile device is configured by higher layers to decode MPDCCH with CRC scrambled by the RA-RNTI, the mobile device shall decode the MPDCCH and the corresponding PDSCH according to any of the combinations defined in Table 7.1-3A. The scrambling initialization of PDSCH corresponding to these MPD-CCHs is by RA-RNTI.

When RA-RNTI and either C-RNTI or SPS C-RNTI are assigned in the same subframe, the mobile device is not required to decode a PDSCH on the primary cell indicated by a PDCCH/EPDCCH with a CRC scrambled by C-RNTI or SPS C-RNTI.

TABLE 7.1-3

PDCCH and PDSCH configured by RA-RNTI

| DCI format | Search Space | Transmission scheme of PDSCH corresponding to PDCCH |
|---|---|---|
| DCI format 1C | Common | If the number of PBCH antenna ports is one, Single-antenna port, port 0 is used (see subclause 7.1.1), otherwise Transmit diversity (see subclause 7.1.2) |

TABLE 7.1-3-continued

PDCCH and PDSCH configured by RA-RNTI

| DCI format | Search Space | Transmission scheme of PDSCH corresponding to PDCCH |
|---|---|---|
| DCI format 1A | Common | If the number of PBCH antenna ports is one, Single-antenna port, port 0 is used (see subclause 7.1.1), otherwise Transmit diversity (see subclause 7.1.2) |

The mobile device is semi-statically configured via higher layer signalling to receive PDSCH data transmissions signaled via PDCCH/EPDCCH according to one of the transmission modes, denoted mode 1 to mode 10.

If a mobile device is configured by higher layers to decode PDCCH with CRC scrambled by the C-RNTI, the mobile device shall decode the PDCCH and any corresponding PDSCH according to the respective combinations defined in Table 7.1-5. The scrambling initialization of PDSCH corresponding to these PDCCHs is by C-RNTI.

If a mobile device is configured by higher layers to decode EPDCCH with CRC scrambled by the C-RNTI, the mobile device shall decode the EPDCCH and any corresponding PDSCH according to the respective combinations defined in Table 7.1-5A. The scrambling initialization of PDSCH corresponding to these EPD-CCHs is by C-RNTI.

When a mobile device is configured in transmission mode 9 or 10, in the downlink subframes indicated by the higher layer parameter mbsfn-SubframeConfigList or by mbsfn-SubframeConfigList-v12x0 or by laa-SCell-SubframeConfig of serving cell c except in subframes for the serving cell: indicated by higher layers to decode PMCH or, configured by higher layers to be part of a positioning reference signal occasion and the positioning reference signal occasion is only configured within MBSFN subframes and the cyclic prefix length used in subframe #0 is normal cyclic prefix, the mobile device shall upon detection of a PDCCH with CRC scrambled by the C-RNTI with DCI format 1A/2C/2D intended for the mobile device or, upon detection of an EPDCCH with CRC scrambled by the C-RNTI with DCI format 1A/2C/2D intended for the mobile device, decode the corresponding PDSCH in the same subframe.

TABLE 7.1-5

PDCCH and PDSCH configured by C-RNTI

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |

TABLE 7.1-5-continued

PDCCH and PDSCH configured by C-RNTI

| Transmission mode | DCI format | Search Space | Transmission scheme of PDSCH corresponding to PDCCH |
|---|---|---|---|
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |

Figure 5:
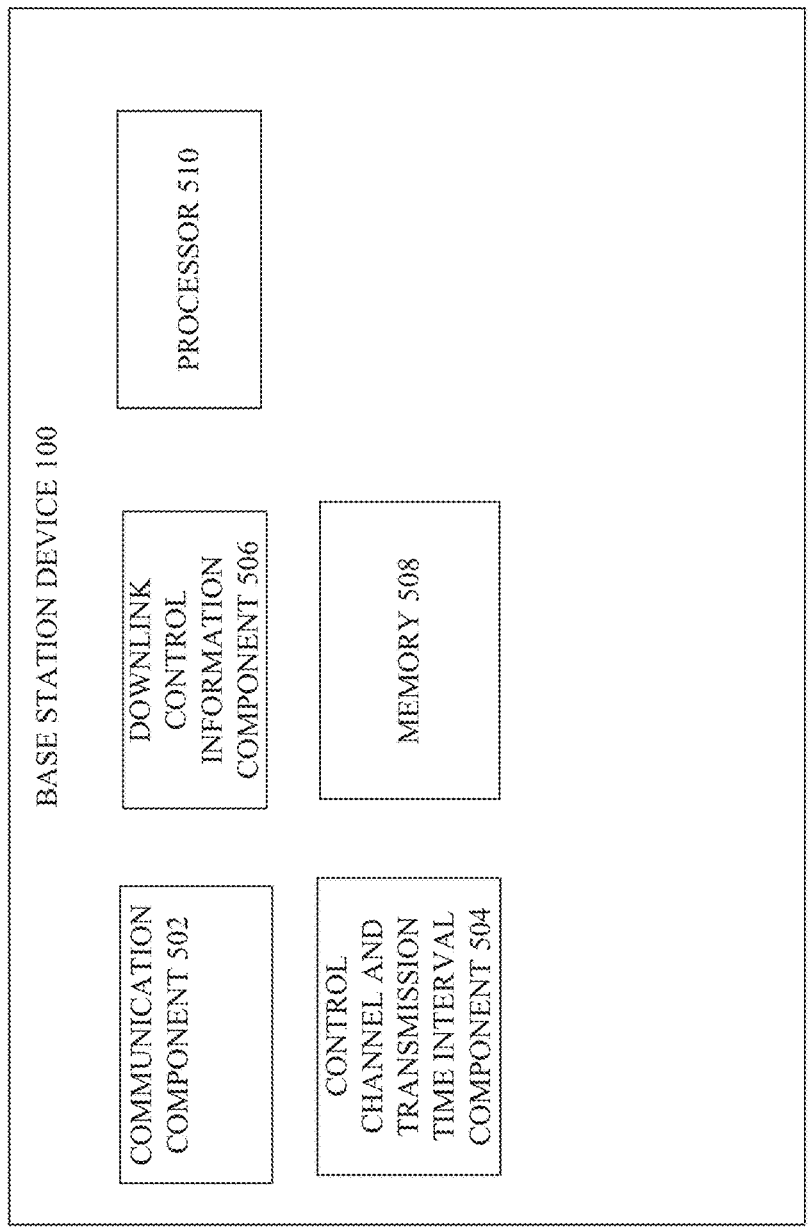

Section 5.3.3 Downlink control information of 3GPP TS 36.212 V13.1.0, "E-UTRA Multiplexing and channel coding (Release 13)" states:

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC. FIG. 5.3.3-1 shows the processing structure for one DCI. The following coding steps can be identified: Information element multiplexing; CRC attachment; Channel coding; and Rate matching.

Figure 19:
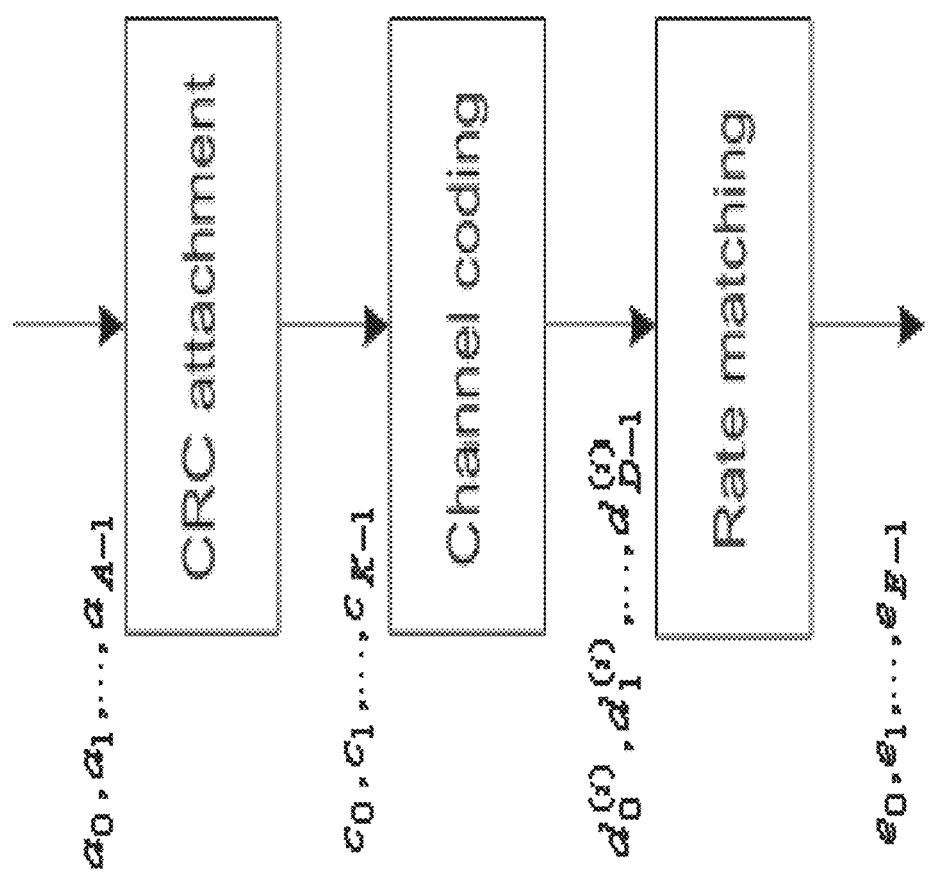

The coding steps for DCI are shown in FIG. 19 (which is also referred to as FIG. 5.3.3-1 herein), which is a block diagram showing processing for one DCI.

5.3.3.2 CRC Attachment

Error detection is provided on DCI transmissions through a Cyclic Redundancy Check (CRC). The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$. A is the payload size and L is the number of parity bits. The parity bits are computed and attached according to section 5.1.1 setting L to 16 bits, resulting in the sequence $b_0, b_1, b_2, b_3, \ldots, b_{B-1}$, where B=A+L. In the case where closed-loop mobile device transmit antenna selection is not configured or applicable, after attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{B-1}$. The relation between $c_k$ and $b_k$ is: $c_k = b_k$ for k=0, 1, 2, . . . , A−1 $c_k = (b_k \pm x_{rnti,k-A}) \mod 2$ for k=A, A+1, A+2, . . . , A+15.

In the case where closed-loop mobile device transmit antenna selection is configured and applicable, after attachment, the CRC parity bits with DCI format 0 are scrambled with the antenna selection mask $x_{AS,0}, x_{AS,1}, \ldots, x_{AS,15}$ as indicated in Table 5.3.3.2-1 and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$$c_k = b_k$$

for k=0, 1, 2, . . . , A−1
$c_k = (b_k + x_{rnti,k-A} + x_{AS,k-A}) \mod 2$ for k=A, A+1, A+2, . . . , A+15.

TABLE 5.3.3.2-1 mobile device transmit antenna selection mask.

| UE transmit antenna selection | Antenna selection mask $<x_{AS,0}, x_{AS,1}, \ldots, x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

The timing relationship between control channel and data channel is specified in LTE. When mobile device receives a control channel in a subframe n for scheduling downlink data, the associated downlink data would located in the data region of the same subframe n. And it would transmit corresponding HARQ feedback in a specific subframe after the reception, e.g., in subframe n+4. For the downlink data reception, asynchronous HARQ is applied, e.g., the retransmission timing is not tied to the feedback timing. Therefore, HARQ process ID would be required for the DL data scheduling. For the UL data scheduling, when mobile device receives a control channel in a subframe n for scheduling uplink data, the associated downlink data would located in subframe n+4. For UL data, there is no control region as the control and/or data are multiplexed in frequency domain and UL data can occupy all symbols in a subframe within the allocated resource, except for those can be occupied by reference signal (RS). And it would expect corresponding HARQ feedback or a retransmission grant in a specific subframe after the reception, e.g., in subframe n+4. For the uplink data transmission, synchronous HARQ is applied, e.g, the retransmission timing is tied to the feedback timing. Therefore, HARQ process ID is not required for the UL data scheduling. More detail timing can be found in below quotation from 3GPP TS 36.213 v13.1.1, "E-UTRA Physical layer procedures (Release 13)," which states:

7.1 UE Procedure for Receiving the Physical Downlink Shared Channel

Except the subframes indicated by the higher layer parameter mbsfn-SubframeConfigList or by mbsfn-SubframeConfigList-v12x0 or by laa-SCellSubframeConfig of serving cell c, a mobile device shall: upon detection of a PDCCH of the serving cell with DCI format 1, 1A, 1B, 1C, 1D, 2, 2A, 2B, 2C, or 2D intended for the mobile device in a subframe, or, upon detection of an EPDCCH of the serving cell with DCI format 1, 1A, 1B, 1D, 2, 2A, 2B, 2C, or 2D intended for the mobile device in a subframe; decode the corresponding PDSCH in the same subframe with the restriction of the number of transport blocks defined in the higher layers.

Section 8.0 UE procedure for transmitting the physical uplink shared channel of 3GPP TS 36.213 v13.1.1, "E-UTRA Physical layer procedures (Release 13)" states:

The term "UL/DL configuration" in this subclause refers to the higher layer parameter subframeAssignment unless specified otherwise. For FDD and normal HARQ operation, the mobile device shall upon detection on a given serving cell of a PDCCH/EPDCCH with DCI format 0/4 and/or a PHICH transmission in subframe n intended for the mobile device, adjust the corresponding PUSCH transmission in subframe n+4 according to the PDCCH/EPDCCH and PHICH information. For FDD-TDD and normal HARQ operation and a PUSCH for serving cell c with frame structure type 1, the mobile device shall upon detection of a PDCCH/EPDCCH with DCI format 0/4 and/or a PHICH transmission in subframe n intended for the mobile device, adjust the corresponding PUSCH transmission for serving cell c in subframe n+4 according to the PDCCH/EPDCCH and PHICH information . . . . For TDD UL/DL configurations 1-6 and normal HARQ operation, the mobile device shall upon detection of a PDCCH/EPDCCH with uplink DCI format and/or a PHICH transmission in subframe n intended for the mobile device, adjust the corresponding PUSCH transmission in subframe n+k, with k given in Table 8-2, according to the PDCCH/EPDCCH and PHICH information. For TDD UL/DL configuration 0 and normal HARQ operation the mobile device shall upon detection of a PDCCH/EPDCCH with uplink DCI format and/or a PHICH transmission in subframe n intended for the mobile device, adjust the corresponding PUSCH transmission in subframe n+k if the MSB of the UL index in the PDCCH/EPDCCH with uplink DCI format is set to 1 or PHICH is received in subframe n=0 or 5 in the resource corresponding to $i_{PHICH}=0$, as defined in subclause 9.1.2, with k given in Table 8-2. If, for TDD UL/DL configuration 0 and normal HARQ operation, the LSB of the UL index in the DCI format 0/4 is set to 1 in subframe n or a PHICH is received in subframe n=0 or 5 in the resource corresponding to $I_{PHICH}=1$, as defined in subclause 9.1.2, or PHICH is received in subframe n=1 or 6, the mobile device shall adjust the corresponding PUSCH transmission in subframe n+7. If, for TDD UL/DL configuration 0, both the MSB and LSB of the UL index in the PDCCH/EPDCCH with uplink DCI format are set in subframe n, the mobile device shall adjust the corresponding PUSCH transmission in both subframes n+k and n+7, with k given in Table 8-2. For TDD UL/DL configurations 1 and 6 and subframe bundling operation, the mobile device shall upon detection of a PDCCH/EPDCCH with DCI format 0 in subframe n intended for the mobile device, and/or a PHICH transmission intended for the mobile device in subframe n−l with l given in Table 8-2a, adjust the corresponding first PUSCH transmission in the bundle in subframe n+k, with k given in Table 8-2, according to the PDCCH/EPDCCH and PHICH information. For TDD UL/DL configuration 0 and subframe bundling operation, the mobile device shall upon detection of a PDCCH/EPDCCH with DCI format 0 in subframe n intended for the mobile device, and/or a PHICH transmission intended for the mobile device in subframe n−l with l given in Table 8-2a, adjust the corresponding first PUSCH transmission in the bundle in subframe n+k, if the MSB of the UL index in the DCI format 0 is set to 1 or if $I_{PHICH}=0$, as defined in subclause 9.1.2, with k given in Table 8-2, according to the PDCCH/EPDCCH and PHICH information. If, for TDD UL/DL configuration 0 and subframe bundling operation, the LSB of the UL index in the PDCCH/EPDCCH with DCI format 0 is set to 1 in subframe n or if $I_{PHICH}=1$, as defined in subclause 9.1.2, the mobile device shall adjust the corresponding first PUSCH transmission in the bundle in subframe n+7, according to the PDCCH/EPDCCH and PHICH information.

TABLE 8-2 k for TDD configurations 0-6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | | | 4 | 6 | | | 4 | 6 |
| 1 | | | | 6 | | | 4 | | | 6 | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | | 7 | 7 | | 5 |

TABLE 8-2a l for TDD configurations 0, 1 and 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 9 | 6 | | | | 9 | 6 | | | |
| 1 | | 2 | | 3 | | 2 | | | | 3 |
| 6 | 5 | 5 | | | | 6 | 6 | | | 8 |

9.1.2 PHICH Assignment Procedure

If a mobile device is not configured with multiple TAGs, or if a mobile device is configured with multiple TAGs and PUSCH transmissions scheduled from serving cell c in subframe n are not scheduled by a Random Access Response Grant corresponding to a random access preamble transmission for a secondary cell. Table 9.1.2-1 illustrates TDD UL/DL configurations for different subframe indices, n.

TABLE 9.1.2-1

$k_{PHICH}$ for TDD

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

10.2 Uplink HARQ-ACK Timing

For TDD or for FDD-TDD and primary cell frame structure type 2 or for FDD-TDD and primary cell frame structure type 1, if a mobile device configured with EIMTA-MainConfigServCell-r12 for a serving cell, "UL/DL configuration" of the serving cell in subclause 10.2 refers to the UL/DL configuration given by the parameter eimta-HARQ-ReferenceConfig-r12 for the serving cell unless specified otherwise. For a non-BL/CE mobile device, for FDD or for FDD-TDD and primary cell frame structure type 1, the mobile device shall upon detection of a PDSCH transmission in subframe n−4 intended for the mobile device and for which an HARQ-ACK shall be provided, transmit the HARQ-ACK response in subframe n. If HARQ-ACK repetition is enabled, upon detection of a PDSCH transmission in subframe n−4 intended for the mobile device and for which HARQ-ACK response shall be provided, and if the mobile device is not repeating the transmission of any HARQ-ACK in subframe n corresponding to a PDSCH transmission in subframes $n-N_{ANRep}-3, \ldots, n-5$, the UE: shall transmit only the HARQ-ACK response (corresponding to the detected PDSCH transmission in subframe n−4) on PUCCH in subframes $n, n+1, \ldots, n+N_{ANRep}-1$; shall not transmit any other signal/channel in subframes $n, n+1, \ldots, n+N_{ANRep}-1$; and shall not transmit any HARQ-ACK response repetitions corresponding to any detected PDSCH transmission in subframes $n-3, \ldots, n+N_{ANRep}-5$.

Furthermore it is agreed in 3GPP to study a new type of control signal, sPDCCH to accommodate the new TTI length:

Agreement: sPDCCH (PDCCH for short TTI) needs to be introduced for short TTI. Each short TTI on DL may contain sPDCCH decoding candidates.

Conclusions: A maximum number of BDs will be defined for sPDCCH in USS. In case 2-level DCI is adopted, any DCI for sTTI scheduling carried on PDCCH can be taken into account in the maximum total number of BDs. FFS whether the maximum number is dependent on the sTTI length. FFS whether the maximum number of blind decodes for (E)PDCCH is reduced in subframes in which the mobile device is expected to perform blind decodes for sPDCCH. FFS whether a mobile device can be expected to monitor both EPDCCH and sPDCCH in the same subframe. FFS whether the maximum number of BDs on PDCCH is changed from the legacy number if DCI on PDCCH is for sTTI scheduling.

Besides the timing domain structure, two-level DCI structure is studied due to the increase of control overhead under shortened TTI. So instead of carrying all the information required for one TTI data reception as done before, some control information in a DCI which may not vary from time to time can be common for multiple TTI would signaled once but not in every TTI. mobile device would assume the same content applied for multiple TTIs. This type of DCI is also called slow DCI. On the other hand, there would still be some information which would vary between TTIs would be signal for each TTI, which is known as fast DCI. For receiving data in one TTI, mobile device may need to combine/concatenate slow DCI and fast DCI to obtain the required information.

Conclusion for study till RAN1#85: Two-level DCI can be studied for sTTI scheduling, whereby: (1) DCI for sTTI scheduling can be divided into two types: "slow DCI": DCI content which applies to more than 1 sTTI is carried on either legacy PDCCH, or sPDCCH transmitted not more than once per subframe; FFS whether "slow DCI" is UE-specific or common for multiple UE; "fast DCI": DCI content which applies to a specific sTTI is carried on sPDCCH; For a sPDSCH in a given sTTI, the scheduling information is obtained from either: a combination of slow DCI and fast DCI, or fast DCI only, overriding the slow DCI for that sTTI. Compare with single-level DCI carried on one sPDCCH or one legacy PDCCH; it is not precluded to consider schemes in which the slow DCI also includes some resource allocation information for the sPDCCH. Methods for reducing the overhead of single-level DCI can also be studied; Single-level DCI multi-sTTI scheduling for a variable number of sTTIs can be included. Aim to reduce the number of schemes under consideration at RAN1#85. An example of content of slow DCI and fast DCI is given below R1-163068, "DL channel design for shortened TTI", Qualcomm Incorporated. Some examples of new TTI structure with different TTI length can be found in R1-163068, "DL channel design for shortened TTI," Qualcomm Incorporated:

2-Stage DCI Design

Since the TTI is shorter, it is critical to limit the control overhead in the transmission. A 2-stage DCI design might help in this. In particular, a stage 0 DCI can carry slowly varying portion of the grant and a stage 1 DCI can carry fast varying portion of the grant.

As an example, stage 0 DCI may carry the following information fields: UL/DL grant identifier, similar to the 1-bit differentiator for DCI formats 0/1A; Base MCS, which indicates a set of MCS values for rate adaptation to a large extent; TPC; Stage 1 DCI scheduling information, e.g., the aggregation level(s) and/or the decoding candidate(s) of a given aggregation level, in order to reduce the number of blind decodes for stage 1 DCI.

On the other hand, Stage 1 DCI may carry the following information fields: HARQ process ID; Resource allocation; sPDSCH rate matching indication, which can alleviate potential resource fragmentation due to sPDCCH or legacy traffic; Precoding Info and antenna ports information; NDI; Additional MCS information, which can provide updated MCS information with respect to that of stage 0 DCI; and UL RS related information, which can provide indication on UL channel structure particularly for sPUCCH.

The transmission of stage 0 DCI can be on a per need basis, while the transmission of stage 1 DCI may accompany with each sPDSCH. With the 2-stage DCI design, it is expected that DL control overhead savings can be realized. It may help increase the coverage area of shortened TTI transmissions.

It is also discussed how to handle transmission with different TTI length:

Agreements: A mobile device is expected to handle the following cases in the same carrier in a subframe Receiving legacy TTI non-unicast PDSCH (except for further study (FFS) for single cell point to multipoint (SC-PTM)) and short TTI unicast PDSCH. Receiving legacy TTI non-unicast PDSCH (except FFS for SC-PTM) and legacy TTI unicast PDSCH(s).

FFS between: Alternative 1: A mobile device is not expected to receive legacy TTI unicast PDSCH and short TTI unicast PDSCH simultaneously on one carrier; Alternative 2: If the mobile device is scheduled with legacy TTI unicast PDSCH and short TTI unicast PDSCH simultaneously on one carrier, then it may skip the decoding of one of them (FFS rules for determining which one). Alternative 3: A mobile device is expected to receive legacy TTI unicast PDSCH and short TTI unicast PDSCH simultaneously on one carrier. FFS mobile device behaviour in case of being scheduled with legacy TTI unicast PDSCH and short TTI unicast PDSCH simultaneously with legacy TTI non-unicast PDSCH (except FFS for SC-PTM) on the same carrier. A mobile device can be dynamically (with a subframe to subframe granularity) scheduled with legacy TTI unicast PDSCH and/or (depends on outcome of FFS above) short TTI PDSCH unicast.

Agreements:

A mobile device can be dynamically (with a subframe to subframe granularity) scheduled with PUSCH and/or sPUSCH. A mobile device is not expected to transmit PUSCH and short TTI sPUSCH simultaneously on the same REs, e.g, by superposition. FFS whether a mobile device may transmit PUSCH and short TTI sPUSCH in the same subframe on one carrier by puncturing PUSCH. FFS whether a mobile device may transmit PUSCH and short TTI sPUSCH in different PRBs on the same symbol(s). Dropping/prioritization rules (if any) are FFS In R2-162660, some relevant texts are quoted as below.

Protocol architecture of the flexible AI

Figure 20:
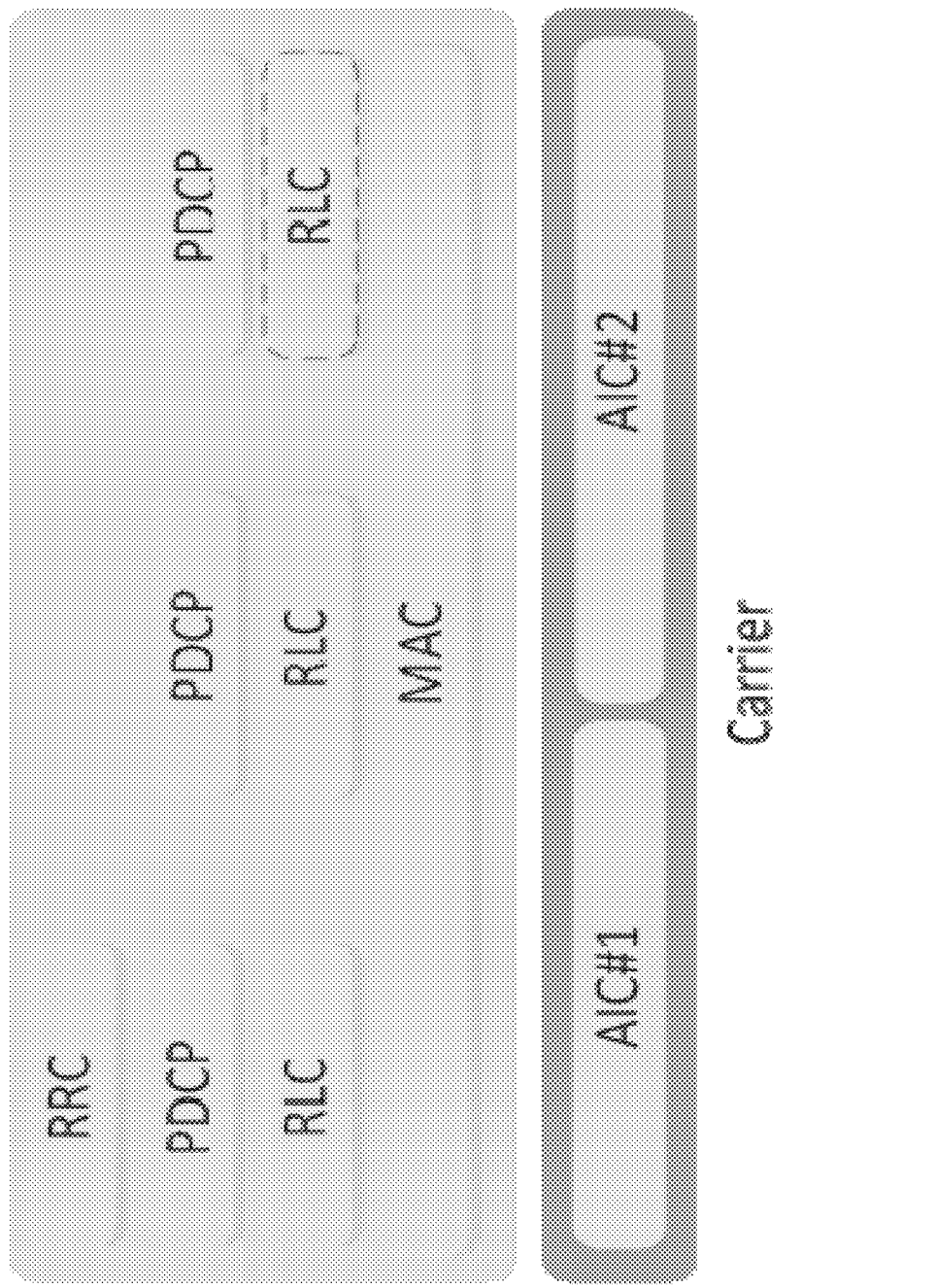

NR flexible AI should provide optimized radio access functions and parameters to adapt to the different use cases. It is assumed that the flexible AI is composed of multiple AI components (AIC). Each AIC is characterized by different set of physical layer features. For example, the waveform, multiple access scheme, frame structure and numerology etc can be different for different AICs. Different AICs may have different physical channel designs, e.g., different channel processing chain and numerology of (E-)PDCCHs and PDSCHs. Higher layer functions of the flexible AI should unite these multiple AICs. Both common functions and AIC specific functions are possible. The AICs can be applied to the same carrier or different carriers. [FIG. 20 herein] depicts an example of the protocol architecture in the case of multiple air interface computers (AICs) on the same carrier. FIG. 20 is an example of flexible air interface (AI) with multiple AICs within the same carrier Proposal 2: Protocol architecture with multiple AICs (e.g, sets of physical layer features) is needed in support of the flexible AI.

Mapping between AIC and time-frequency resources

A flexible MAC layer is necessary to enable the flexible AI. Generally, MAC needs to address two kinds of AIC deployment schemes:

Option 1: semi-static mapping between AIC and time-frequency resource

In this scheme, the mapping between AIC and spectrum is fixed for a time period. RAN allocates AICs to a sub-band of the carrier according to the decision of a centralized control plane or OAM. MAC can only allocate radio resources for services using the AIC within the corresponding sub-band. The mapping between AIC and spectrum can be adjusted according to the load, traffic volume, and radio condition, etc. E.g. the sub-band bandwidth and position allocated to a certain AIC can be changed. Moreover, AICs can be added or deleted. RAN configures the mobile device with one or more AICs and the corresponding sub-band information by RRC.

Option 2: dynamic mapping between AIC and time-frequency resource

In this scheme, time frequency resources for the AICs can be allocated dynamically per TTI. RAN does not fix the mapping between AIC and sub-band-, i.e, In each TTI, a certain AIC may use any physical resource blocks (PRBs) within the carrier bandwidth. The presences of AICs are also dynamic. For example, in TTI#1, AIC#1 is present; in the next TTI, AIC#2 is present; in another TTI, both AIC#1 and AIC#2 are present. Justification of this scheme can be that the traffic and radio conditions are very dynamic such that radio resource requirements for each AIC are very dynamic accordingly. RAN configures mobile device with one or more AICs by RRC. However, RAN does not indicate mobile device the mapping relationship between AIC and sub-band by RRC. MAC layer determines the radio resources allocation to each AIC, and further determines the time frequency resource allocation to services using certain AIC at per TTI basis.

Comparison of option 1 and option 2 is depicted in Table 1:

TABLE 1

|  | Semi-static | Dynamic |
| --- | --- | --- |
| RAN impacts | Interference coordination among transmission points (TP) can be achieved with existing eICIC, CoMP schemes assuming semi-static alignment of AIC and sub-band mapping for multi-cells; Backhaul latency requirement can be loosen; | Inter-TP interference coordination is more dynamic if different AICs in different TPs are not aligned; low latency backhaul is needed; |
| UE impacts | UE is aware of the AIC and sub-band information by configuration, blind detection of multiple AICs is not required; | UE may have to blindly detect which AIC(s) are used per TTI; |
| Service multiplexing efficiency | May sacrifice some efficiency due to AIC reconfiguration latency | Can be high with proper RRM algorithms |

For both options, both frequency division (FDM) and time division multiplexing (TDM) schemes are possible for multiple AICs within the flexible AI framework. The TDM and FDM schemes can be utilized at different time period or simultaneously. Other means e.g., spatial division multiplexing (SDM) or code division multiplexing (CDM) are also possible.

Observation 1: Both semi-static and dynamic mapping between AICs and time-frequency resources are possible. Mapping between logical channels and AICs Mapping between logical channels and transport channels is an important function in LTE MAC. In the carrier aggregation (CA) scenario, data packets from a bearer can be transmitted via the PCell or SCells according to MAC scheduling decision. It is assumed that logical channels to transport channel mapping is still one of the fundamental functions of NR MAC. When NR flexible AI is utilized, data packets of every logical channel need to be transmitted through one or more AICs. Therefore, NR MAC should handle the mapping between logical channels and AICs. Semi-static and dynamic mapping between logical channels and AICs are possible according to service requirements, radio conditions and deployment scenarios etc. They can be applied to both option 1 and option 2 regarding the mapping between AIC and time-frequency resources. Mapping between logical channel and AIC can be independent of mapping between AIC and radio resources. E.g. Modification of AIC and radio resource mapping does not necessarily lead to change of logical channel and AIC mapping, and vice versa.

Semi-static mapping means that the mapping between logical channel and AIC is configured by RRC. The logical channel packets are transmitted only over a particular AIC. MAC performs logical channel multiplexing according to configured mapping relationship. This scheme can be a typical use case, e.g., kind of service characteristics demands certain kind of AIC numerology design.

Dynamic mapping means that MAC decides which AIC to be used to transmit the user traffic per TTI. For example, in the flexible TTI scheme, the interference condition or packet size variation may require different TTI length for higher efficiency. Assuming different TTI length is identified by different AIC indices. MAC determines variable TTI lengths to be used for the same logical channel at different conditions. The flexible AI model in this scheme is similar to carrier aggregation (CA), each AIC can be considered as a CC. The packets from a bearer can be transmitted via any AIC according to scheduling decision, similar to the case of CA where a bearer can be routed via any one of the CCs.

In the NR (e.g., 5G) flexible AI framework, it is expected that TTI length can be configurable or dynamically changed over time, frequency, spatial and code domains.

Observation 2: Both semi-static and dynamic mapping between logical channels and AICs are possible.

Observation 3: The mapping between AICs and time-frequency resources, and the mapping between logical channels and AICs can be independent.

In R2-162227, 3GPP TSG RAN WG2 #93b, "Discussion on Study Areas for URLLC in 5G New Radio Interface," is some relevant texts are quoted as below.

3.1 New Frame Structure

User plane latency largely depends on frame structure, especially TTI length, so that 5G new RAT is expected to adopt new frame structure that includes short TTI. Although discussion on new frame structure design will be mainly conducted by RAN1, it is meaningful for RAN2 to consider its impact on layers 2 and 3.

Figure 21:
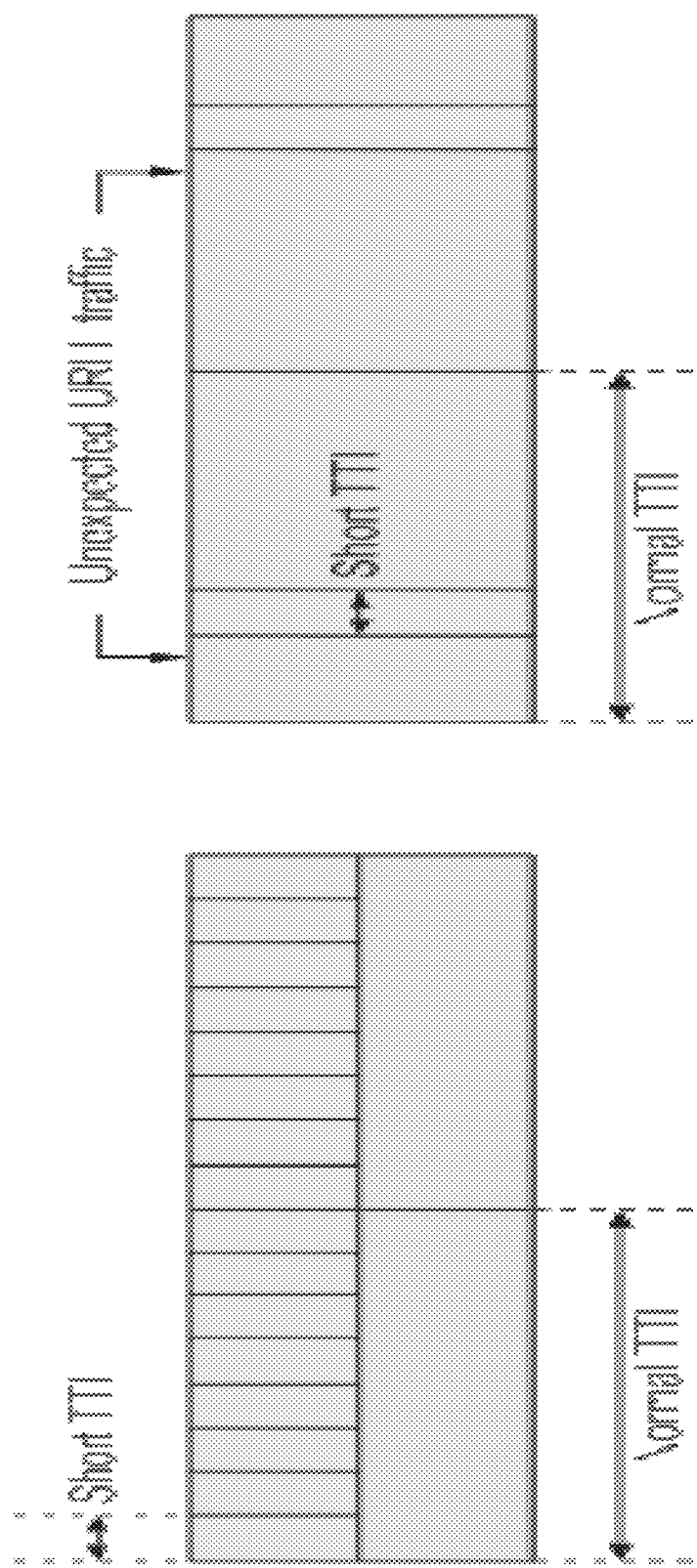

Basically, multiplexing URLL traffic with normal (e.g., eMBB) traffic in the same carrier may provide better spectral resource utilization compared to allocating URLL traffic to the dedicated carrier. In addition, decreasing scheduling latency, which is defined as the time from when a data is generated to when it is scheduled, is necessary. From these perspectives, we can consider the following two frame structures as examples (as shown in FIG. 21). FIG. 21 is a frame structure with fixed short TTIs (left) and opportunistic short TTIs (right). FIG. 21 shows (a) the frame structure with fixed short TTIs and (b) that with opportunistic short TTIs. In the case (a), an eNB is always able to use not only normal TTIs but also short TTIs. Under the consideration of such a frame structure, it is required to study how to utilize always-existing short TTIs from RAN2 perspective.

In the case (b), an eNB typically uses the given resources as normal TTIs. Furthermore, short TTIs can be opportunistically allocated on top of the normal TTI whenever URLL traffic suddenly occurs. Note that the normal traffic carried on the normal TTI can be punctured (or not) during the short TTI. Due to the uncertainty of the existence of the URLL traffic, there can be several issues like how to schedule these opportunistic short TTIs.

Observation 1: It is necessary to study the impact of new frame structure with short TTI on RAN2 subject to the URLLC requirements in 5G.

In R1-163267, 3GPP TSG-RAN WG1 Meeting #84bis, "On design of DL control channel for shorter TTI operation," some relevant texts are quoted as below:

2. Two-Step Control Channel Design

When sTTI mobile devices are multiplexed with legacy mobile devices in frequency domain, the eNB scheduler is able to reserve or dedicate sTTI resources with a 1 ms granularity. Therefore, we think that signaling of these dedicated resources from the eNB to sTTI mobile device in the form of a sTTI band grant would be beneficial.

This sTTI band grant would be transmitted in PDCCH in the beginning of the subframe and could therefore at least indicate the DL resources within the same DL subframe. Moreover, such sTTI grant could be also understood as an ON/OFF switch of sTTI operation at least in this DL subframe. For example, a mobile device configured for sTTI operation but not receiving the sTTI band grant could switch OFF the sTTI related processing, leading to power savings as e.g unnecessary sTTI DL control decoding would not be required. In addition, sTTI band grant could simplify the resource allocation signaling as the sTTI resources given in the sTTI band grant already point to a subset of the overall available PRB resources. Last but not least, the sTTI band grant could give the mobile device some more information on where to look for the short (E)PDCCH for sTTI operation (e.g, sPDCCH or sEPCCH) within the DL carrier.

Figure 22:
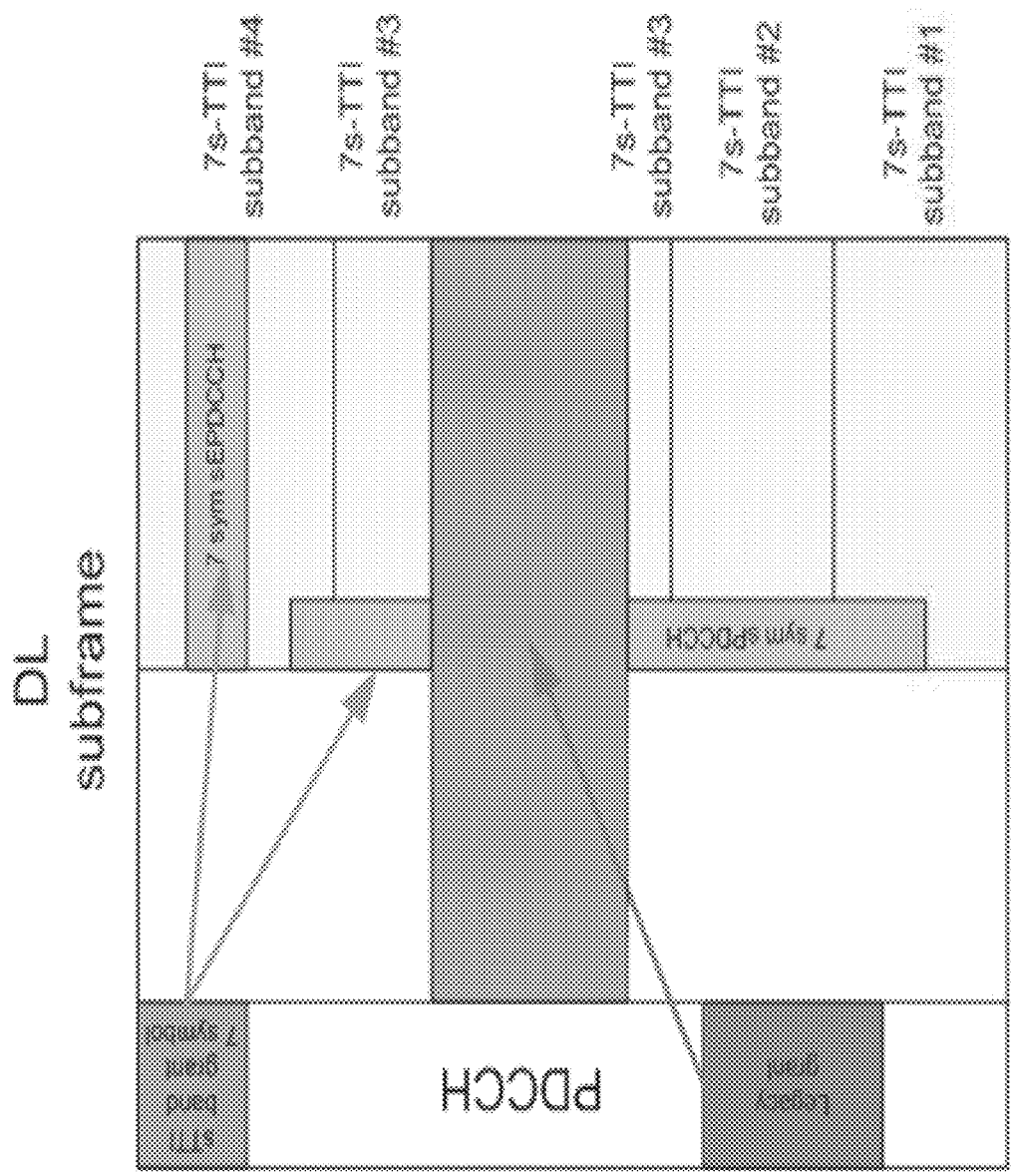

FIG. 22 illustrates an example of two-step grant operation, where sTTI band grant transmitted in PDCCH determines resources available for sTTI and at the same time points into the sTTI control region. In this example, the sTTI band in the second slot is split into four independently schedulable sub-bands, which allow s(E)PDCCH to schedule up to four mobile devices within the sTTI. FIG. 22 illustrates a two-step control operation.

3GPP TSG-RAN WG2 Meeting #93bis, "User throughput evaluation on mobility events," R1-162963 states:

Considerations on sPDCCH

It has been agreed that non-sTTI and sTTI resources can be multiplexed in a frequency domain within a subframe from an eNB perspective. In order to avoid legacy mobile device impact and increase resource utilization, the sTTI resources can be configured in a subset of PRBs in a subframe. Assuming that multiple sTTI lengths for downlink transmission are supported, a set of PRBs can be associated with an sTTI length and multiple sets of PRBs can be configured as sTTI resources as shown in the FIG. 1 for instance.

The sTTI resources in a subframe can be configured via a higher layer signaling to reduce the L1 control signaling overhead or dynamic configuration using a DCI. The dynamic configuration using a DCI may provide a higher flexibility in terms of resource scheduling for sTTI operation while error propagation should be handled carefully as if a mobile device fail to receive the DCI for sTTI resource configuration, the mobile device is not able to receive sPDCCH as well. On the other hand, the higher layer signaling based configuration is more robust to the error propagation and requires much less control signaling overhead.

Proposal-1: sTTI resources in a subframe is semi-statically configured

An sPDCCH can be located in each sTTI to minimize the processing delay so that a mobile device may not need to wait to receive an associate sPDSCH. A mobile device needs to blindly decode sPDCCH candidates in its search space in each sTTI which may result in excessive blind decoding complexity as the number of sTTI in a subframe gets larger. Given that an eNB scheduler may know the use of sTTI resource in a subframe from the beginning, the presence of sTTI resource in the subframe can be indicated in each subframe (e.g., in legacy PDCCH region), therefore a mobile device may skip monitoring sPDCCHs in the subframe.

Figure 23:
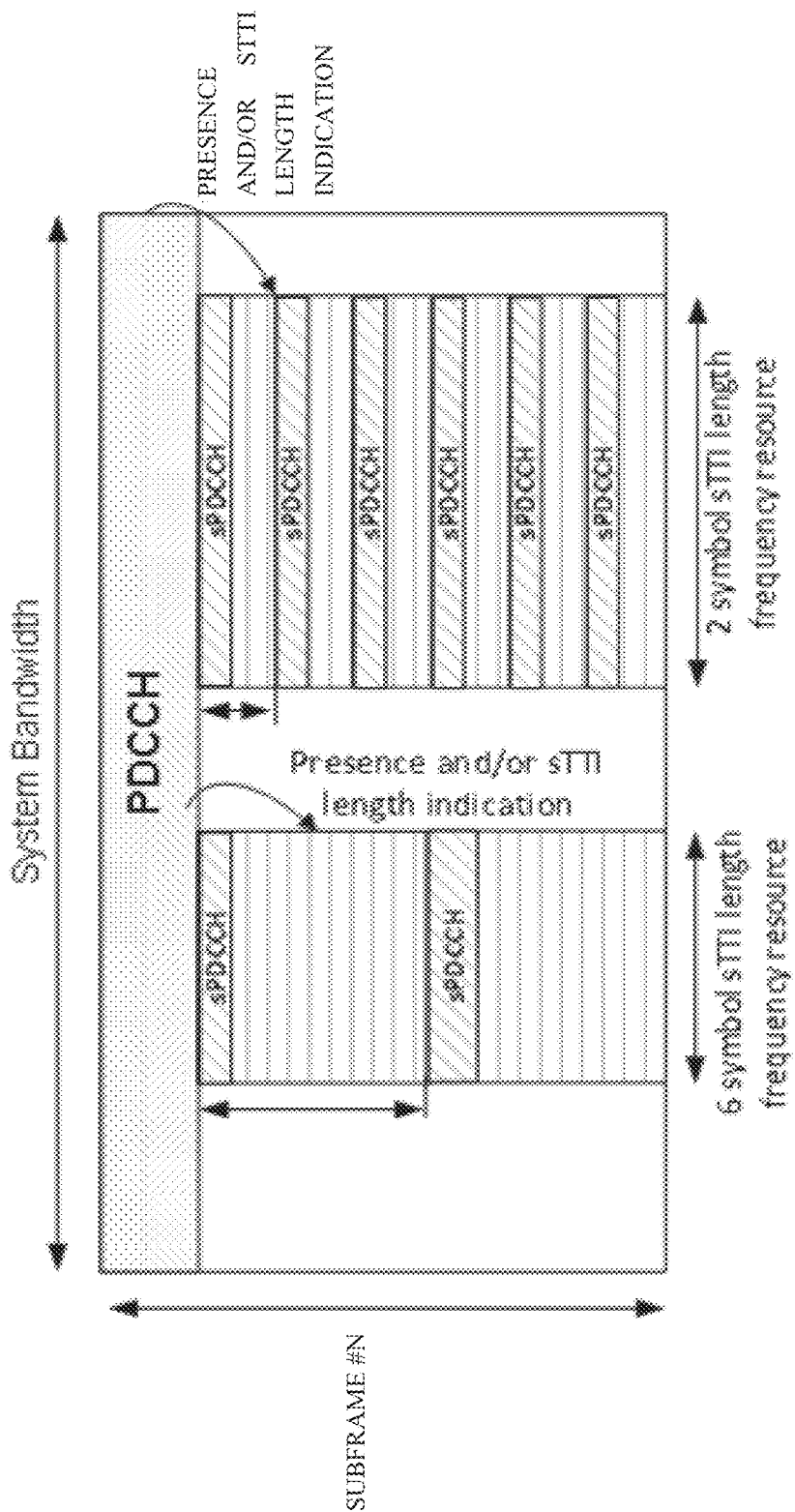

FIG. 23 is an example of sTTI resource configuration in a subframe.

The FIG. 23 shows an example of semi-static configuration of multiple sTTI resources in a subframe and use a dynamic indication for sTTI resource presence indication for a mobile device to monitor sPDCCH candidates if the sTTI resource is present.

Proposal-2: the presence of sTTI resource in a subframe can be dynamically indicated An sPDCCH region in which sPDCCH candidates are monitored can be located in each sTTI and the sPDCCH region can be used as a UE-specific search space for downlink DCI transmission as well as uplink grant. As similar to legacy PDCCH region, a mobile device monitors a UE-specific search space in a sPDCCH region for both downlink and uplink transmission. To reduce the blind decoding complexity, the DCI format size for DL DCI and UL DCI can be matched.

Proposal-3: a single sPDCCH search space is configured for both DL DCI and UL DCI.

In one embodiment, a computer-implemented method is provided. The computer-implemented method can comprise: monitoring, by a mobile device comprising a processor, a first control channel in the beginning of a first transmission time interval (TTI); receiving, by the mobile device, a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and determining, by the mobile device, whether to monitor the second control channel of the second TTI based on the information of the first DCI.

In another embodiment, another computer-implemented method is provided. The computer-implemented method can comprise: monitoring, by a mobile device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI; monitoring, by the mobile device, the second control channel of the second TTI based on a defined information without detection of a first downlink control information (DCI) on the first control channel in the first TTI; receiving, by the mobile device, a second DCI on the second control channel; and performing, by the mobile device, a defined action based on the second DCI or the defined information. One skilled in the art will understand that in some embodiments, the defined action is based on the second DCI and the defined condition. Thus, the cases in which the second DCI is based on one of the second DCI or the defined information and the case in which the defined action is based on the second DCI and the defined information are both included within the scope of the term "or" as used herein.

In another embodiment, another computer-implemented method is provided. The computer-implemented method can comprise: monitoring, by a mobile device coupled to a processor, a first control channel in the beginning of a first TTI; monitoring, by the device, a second control channel of the second TTI without detection of a first downlink control information (DCI) on the first control channel in the first TTI, wherein the second control channel occurs later than the first control channel and the second TTI is shorter than the first TTI; receiving, by the device, a second DCI on the second control channel; and performing, by the device, a defined action based on the second DCI or defined information.

In another embodiment, a mobile device is provided. The mobile device can comprise: a control circuit; a processor installed in the control circuit; and a memory installed in the control circuit and operatively coupled to the processor, wherein the processor is configured to execute a program code stored in memory to perform resource requesting in a wireless communication system by operations. The operations can comprise: monitoring a first control channel in the beginning of a first transmission time interval (TTI); receiving a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and determining, by the mobile device, whether to monitor the second control channel of the second TTI based on the information of the first DCI.

In another embodiment, another mobile device is provided. The mobile device can comprise: a control circuit; a processor installed in the control circuit; and a memory installed in the control circuit and operatively coupled to the processor, wherein the processor is configured to execute a program code stored in memory to perform resource requesting in a wireless communication system by operations. The operations can comprise: monitoring, by a mobile device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI; monitoring, by the mobile device, the second control channel of the second TTI based on a defined information without detection of a first downlink control information (DCI) on the first control channel in the first TTI; receiving, by the mobile device, a second DCI on the second control channel; and performing, by the mobile device, a defined action based on the second DCI or the defined information; monitoring a first control channel in the beginning of a first transmission time interval (TTI); receiving a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and determining, by the mobile device, whether to monitor the second control channel of the second TTI based on the information of the first DCI.

In yet another embodiment, another mobile device is provided. The mobile device can comprise: a control circuit; a processor installed in the control circuit; and a memory installed in the control circuit and operatively coupled to the processor, wherein the processor is configured to execute a program code stored in memory to perform resource requesting in a wireless communication system by operations. The operations can comprise: monitoring, by a device coupled to a processor, a first control channel in the beginning of a first TTI; monitoring, by the device, a second control channel of the second TTI without detection of a first downlink control information (DCI) on the first control channel in the first TTI, wherein the second control channel occurs later than the first control channel and the second TTI is shorter than the first TTI; receiving, by the device, a second DCI on the second control channel; and performing, by the device, a defined action based on the second DCI or defined information.

In yet another embodiment, a computer-readable storage mobile device is provided. The computer-readable storage mobile device can store executable instructions that, in response to execution, cause a system comprising a processor to perform operations, comprising: monitoring a first control channel in the beginning of a first transmission time interval (TTI); receiving a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and determining, by the mobile device, whether to monitor the second control channel of the second TTI based on the information of the first DCI.

In yet another embodiment, a computer-readable storage mobile device is provided. The computer-readable storage mobile device can store executable instructions that, in response to execution, cause a system comprising a processor to perform operations, comprising: monitoring, by a device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI; monitoring, by the mobile device, the second control channel of the second TTI based on a defined information without detection of a first downlink control information (DCI) on the first control channel in the first TTI; receiving, by the mobile device, a second DCI on the second control channel; and performing, by the mobile device, a defined action based on the second DCI or the defined information.

In yet another embodiment, another computer-readable storage mobile device is provided. The computer-readable storage mobile device stores executable instructions that, in response to execution, cause a system comprising a processor to perform operations, comprising: monitoring a first control channel in the beginning of a first TTI; monitoring a second control channel of the second TTI without detection of a first downlink control information (DCI) on the first control channel in the first TTI, wherein the second control channel occurs later than the first control channel and the second TTI is shorter than the first TTI; receiving a second DCI on the second control channel; and performing a defined action based on the second DCI or defined information.

One or more embodiments of the inventions described herein can be applied to or implemented in exemplary wireless communication systems and devices described below. In addition, in some embodiments, the inventions are described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems can be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, or some other modulation techniques.

FIG. 1 illustrates an example, non-limiting schematic diagram of a multiple access wireless communication system that facilitates detection of control channels with different TTIs in accordance with one or more embodiments described herein. In some embodiments, an access network 100 (AN) includes multiple antenna groups (e.g., a first antenna group including antennas 104, 106 and a second antenna group including antennas 108, 110 and a third antenna group including antennas 112, 114.). As used herein, the terms "access network" and "base station" (BS) and "base station device" (BS device) can be interchangeable. Thus, in some embodiments, FIG. 1 can show base station device 100.

In FIG. 1, only two antennas are shown for each antenna group of the BS device 100, however, more or fewer antennas can be utilized for each antenna group. Access Terminal 116 (AT) (which can also be referred to as "mobile device") can be configured to communicate with one or more of antennas 112, 114, where antennas 112, 114 transmit information to mobile device 116 over forward link 120 (which is also referred to as the "downlink" or "downlink channel") and receive information from mobile device 116 over reverse link 118 (which is also referred to as the "uplink" or "uplink channel"). Mobile device 122 is in communication with antennas 106 and 108, where antennas 106 and 108 transmit information to mobile device 122 over downlink channel 126 and receive information from mobile device 122 over uplink channel 124. In a FDD system, communication links 118, 120, 124 and 126 may use different frequency for communication. For example, downlink channel 120 may use a different frequency than that used by uplink channel 118.

Each group of antennas and/or the area in which the group of antennas is designed to communicate can be often referred to as a "sector" of the BS device. In the embodiment, antenna groups each are designed to communicate to mobile devices in a sector of the areas covered by BS device 100.

In communication over downlink channels 120, 126, the transmitting antennas of BS device 100 can utilize beamforming in order to improve the signal-to-noise ratio of downlink channels for the different mobile devices 116, 122. Also, BS device 100 using beamforming to transmit to mobile devices scattered randomly through the coverage area of the BS device 100 normally causes less interference to mobile devices in neighboring cells than BS device 100 transmitting through a single antenna to all its mobile devices.

A BS device 100 can be a fixed station or base station used for communicating with the terminals and may also be referred to as an access point, a Node B, an enhanced base station, an eNodeB, or some other terminology. An mobile device may also be called user equipment (UE), a wireless mobile device, terminal, mobile device or some other terminology.

Figure 2:
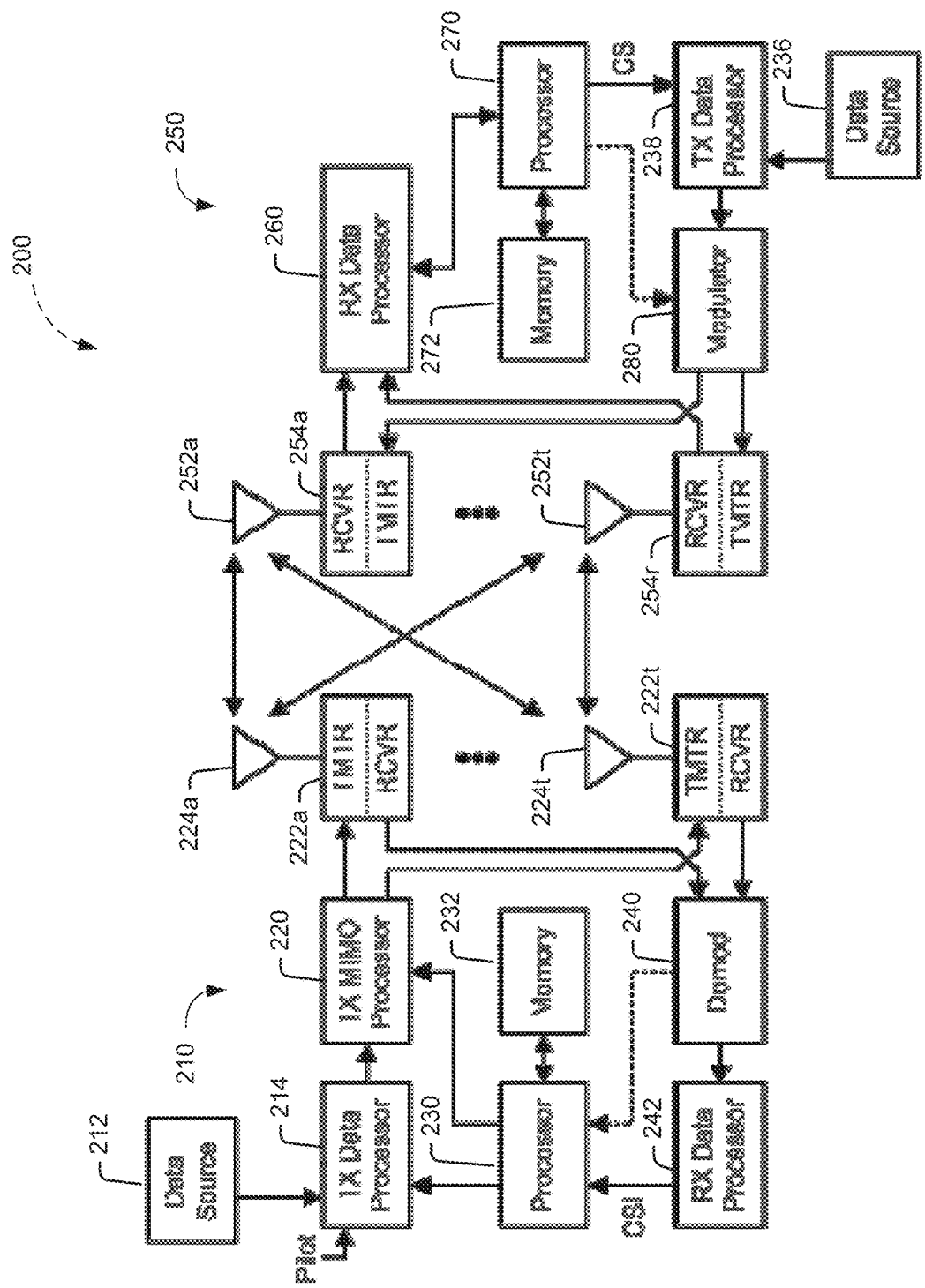

FIG. 2 illustrates an example, non-limiting simplified block diagram of an embodiment of a transmitter) and a receiver system in a multiple input multiple output (MIMO) system that facilitates detection of control channels with different TTIs in accordance with one or more embodiments described herein. Repetitive description of like elements employed in other embodiments described herein is omitted for sake of brevity.

In some embodiments, as shown, FIG. 2 is a simplified block diagram of an embodiment of a transmitter system 210 and a receiver system 250 (also known as mobile device or user equipment (UE)) in a MIMO system 200. In some embodiments, the transmitter system 210 can be included in the BS device 100 (and/or be the BS device 100). In some embodiments, the receiver system 250 can be (or be included in) the receiver system 250. At the transmitter system 210, traffic data for a number of data streams can be provided from a data source 212 to a transmit (TX) data processor 214.

In one embodiment, each data stream (or, in some embodiments, one or more data streams) is transmitted over a respective transmit antenna. TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

In one embodiment, each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

In some embodiments, the processor 270 periodically determines which pre-coding matrix to use (discussed below). Processor 270 formulates a uplink channel message comprising a matrix index portion and a rank value portion.

The uplink channel message can comprise various types of information regarding the communication link and/or the received data stream. The uplink channel message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 can be used to temporarily store some buffered/computational data from 240 or 242 through processor 230, store some buffed data from 212, or store some specific program codes. Further, memory 272 can be used to temporarily store some buffered/computational data from 260 through processor 270, store some buffed data from 236, or store some specific program codes.

Figure 3:
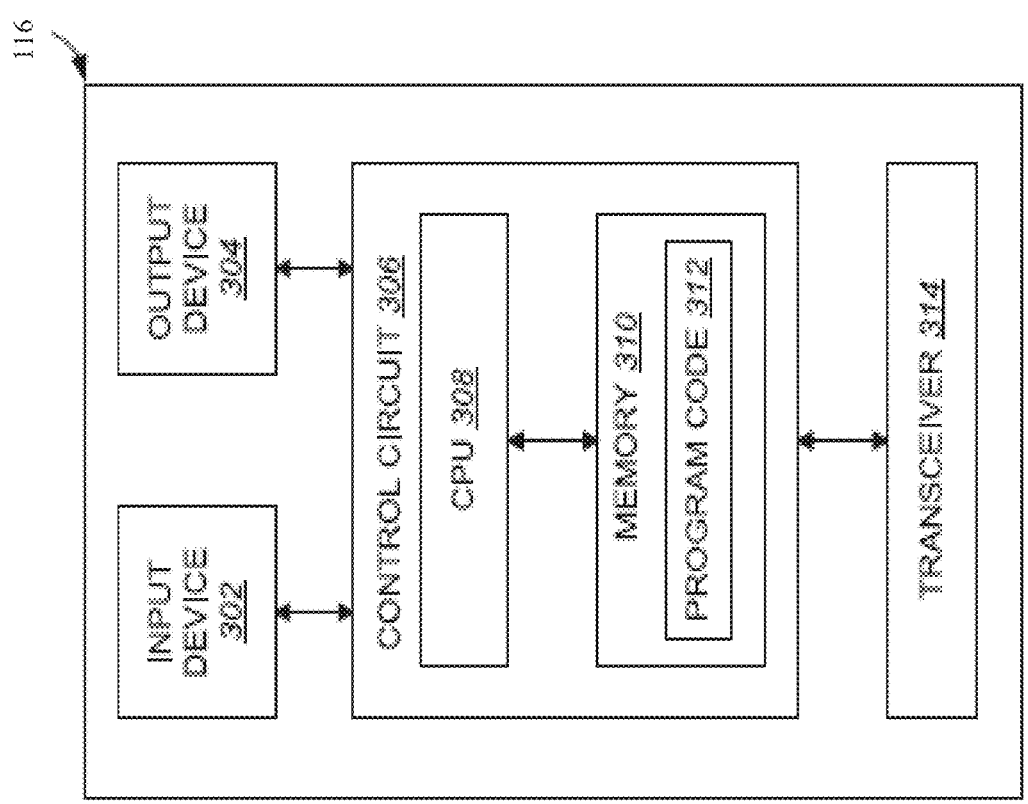

FIG. 3 illustrates an example, non-limiting block diagram of a mobile device for which detection of control channels with different TTIs can be facilitated in accordance with one or more embodiments described herein. Repetitive description of like elements employed in other embodiments described herein is omitted for sake of brevity.

In some embodiments, the mobile device 116 in a wireless communication system can include one or more of the function and/or structure of mobile devices 116, 122 in FIG. 1. In some embodiments, the wireless communications system 200 can be the LTE system in some embodiments. In other embodiments, the communication system 200 can be other systems other than the LTE system. The mobile device 116 can include an input device 302, an output device 304, a control circuit 306, a central processing unit (CPU) 308, a memory 310, a program code 312, and a transceiver 314. The control circuit 306 can executes the program code 312 in the memory 310 through the CPU 308, thereby controlling an operation of the mobile device 116. The mobile device 116 can receive signals input by a user through the input device 302, such as a keyboard or keypad, and can output images and sounds through the output device 304, such as a monitor or speakers. The transceiver 314 can be used to receive and transmit wireless signals, delivering received signals to the control circuit 306, and outputting signals generated by the control circuit 306 wirelessly.

Figure 4:
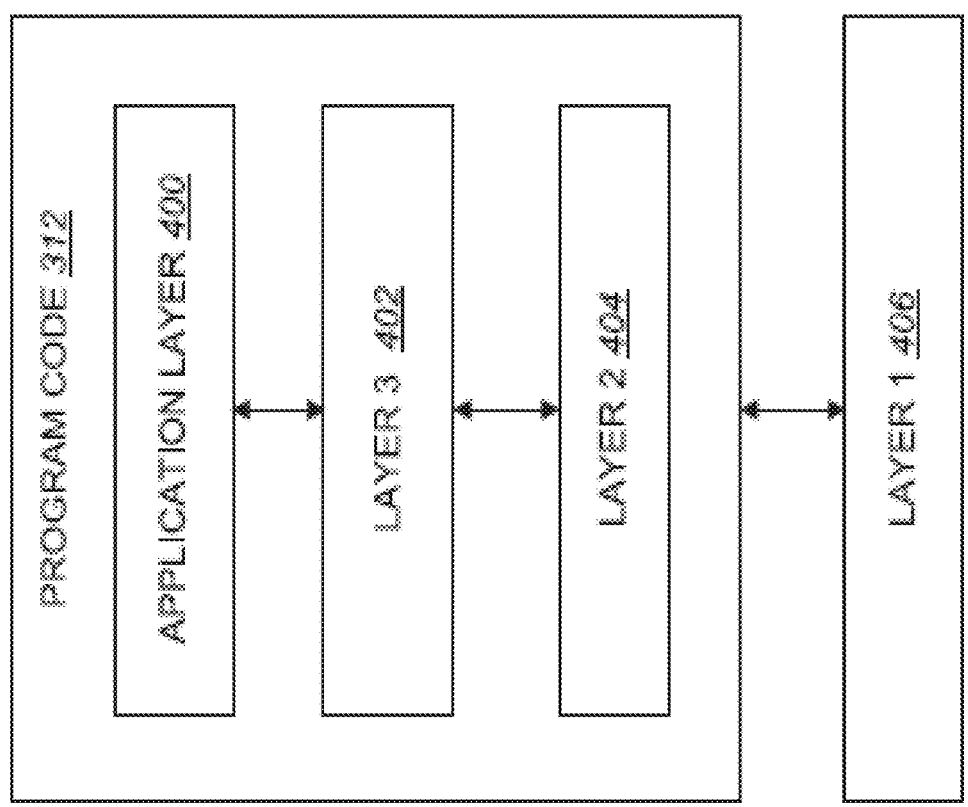

FIG. 4 illustrates an example, non-limiting block diagram of computer program code shown in FIG. 3 that facilitates detection of control channels with different TTIs in accordance with one or more embodiments described herein. Repetitive description of like elements employed in other embodiments described herein is omitted for sake of brevity.

In some embodiments, FIG. 4 illustrates program code 312 shown in FIG. 3 in accordance with one embodiment of the invention. In this embodiment, the program code 312 includes an application layer 400, a layer 3 portion 402, and a layer 2 portion 404, and is coupled to a layer 1 portion 406. The layer 3 portion 402 generally performs radio resource control. The layer 2 portion 404 generally performs link control. The layer 1 portion 406 generally performs physical connections. For LTE or LTE-A system, the layer 2 portion 404 may include a Radio Link Control (RLC) layer and a Medium Access Control (MAC) layer. The layer 3 portion 402 can include a Radio Resource Control (RRC) layer.

While FIG. 2 showed one embodiment of a transmitter system 210, which can be included in BS device 100, in another embodiment, the transmitter system 210 can be or include BS device 100. Similarly, while FIG. 2 showed one embodiment of a reception system 250, which can be included in mobile device 116, in another embodiment, the transmitter system 210 can be or include mobile device 116.

Figure 6:
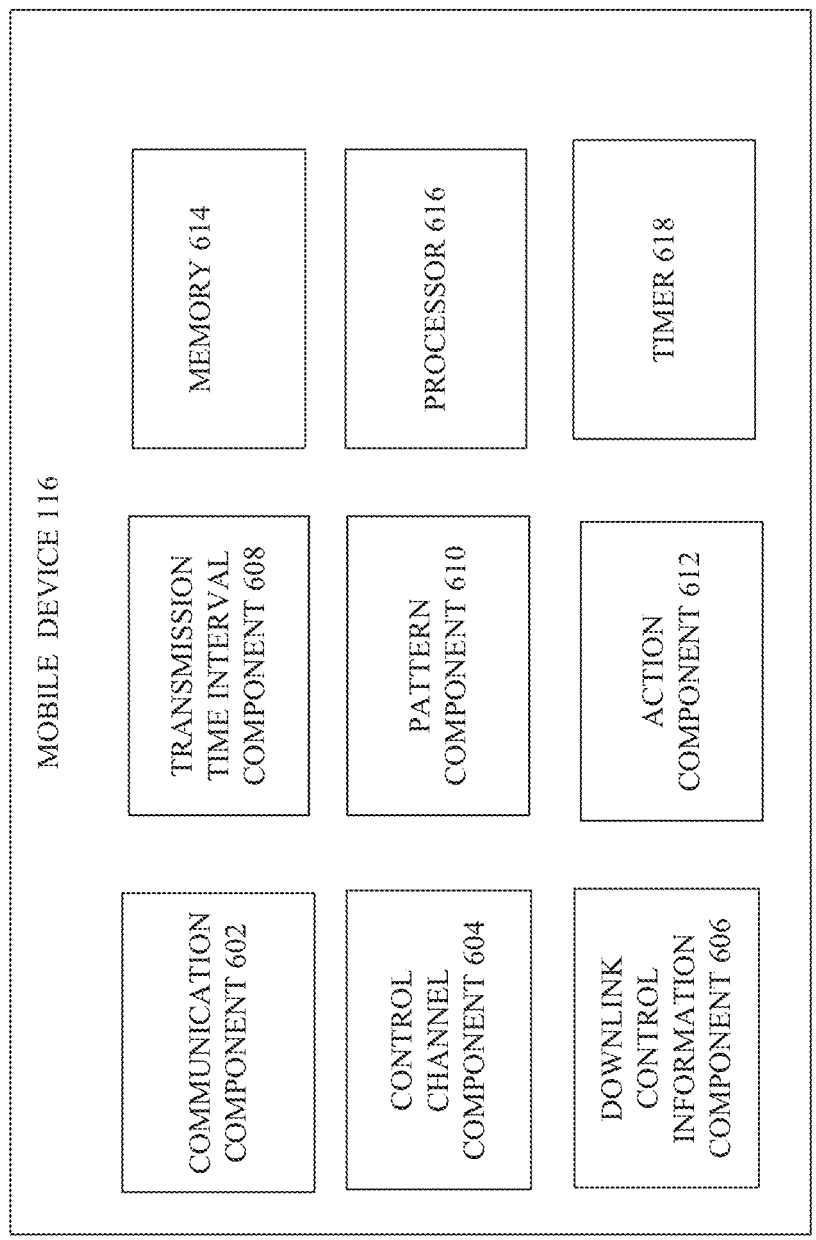

FIG. 5 illustrates an example, non-limiting block diagram of another base station device that can facilitate detection of control channels with different TTIs in accordance with one or more embodiments described herein. FIG. 6 illustrates an example, non-limiting block diagram of another mobile device for which detection of control channels with different TTIs can be facilitated in accordance with one or more embodiments described herein. Repetitive description of like elements employed in other embodiments described herein is omitted for sake of brevity.

BS device 100 can comprise communication component 502, control channel and TTI component 504, DCI component 506, memory and/or processor 510. In various embodiments, one or more of communication component 502, control channel and TTI component 504, DCI component 506, memory and/or processor 510 can be electrically and/or communicatively coupled to one another to perform one or more functions of BS device 100.

Mobile device 116 can comprise communication component 602, control channel component 604, DCI component 606, TTI component 608, pattern component 610, action component 612, memory 614 and/or processor 616. In various embodiments, one or more of communication component 602, control channel component 604, DCI component 606, TTI component 608, pattern component 610, action component 612, memory 614 and/or processor 616 can be electrically and/or communicatively coupled to one another to perform one or more functions of mobile device 116. In some embodiments, memory 614 can store computer readable storage media and/or computer executable instructions or computer executable code that can be executed on processor 616 to perform one or more functions of mobile device 116. In some embodiments, memory 508 can store computer readable storage media and/or computer executable instructions or computer executable code that can be executed on processor 510 to perform one or more functions of BS device 100. One or more embodiments will be described with reference to BS device 100 and/or mobile device 116 (or components thereof) as noted in FIGS. 1, 2, 3, 4 and/or 5.

Figure 7:
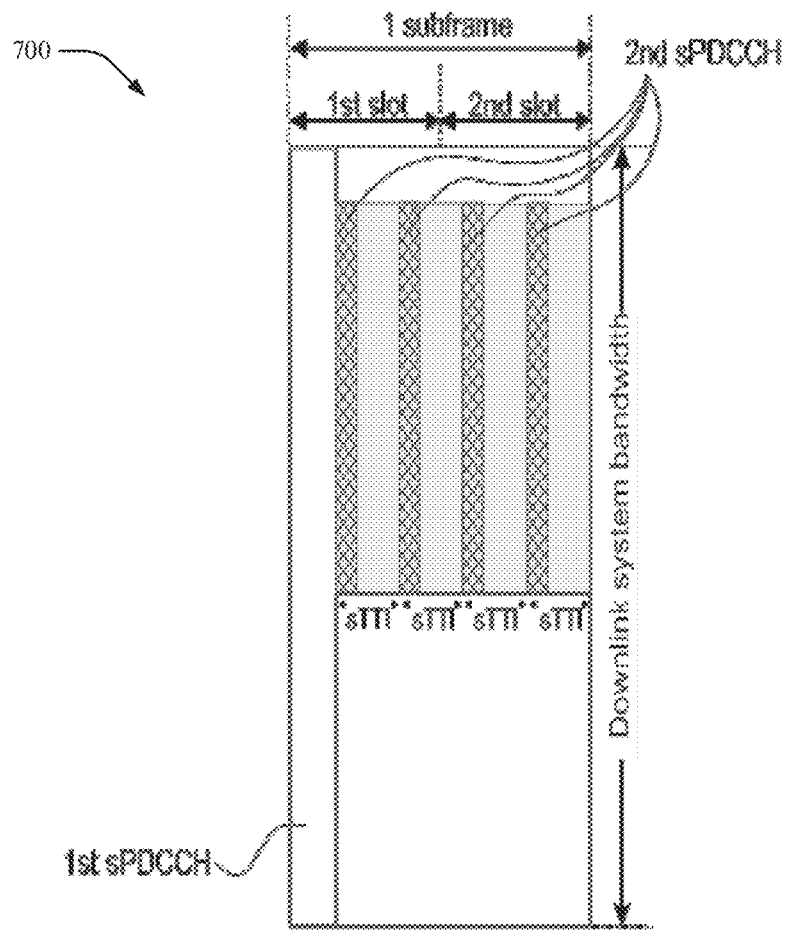

FIG. 7 illustrates an example, non-limiting packet framework that illustrates two level downlink control information (DCI) that facilitates detection of control channels with different TTIs in accordance with one or more embodiments described herein. FIG. 7 illustrates an example, non-limiting packet framework that illustrates two level downlink control information (DCI) that facilitates detection of control channels with different TTIs in accordance with one or more embodiments described herein.

Figure 8:
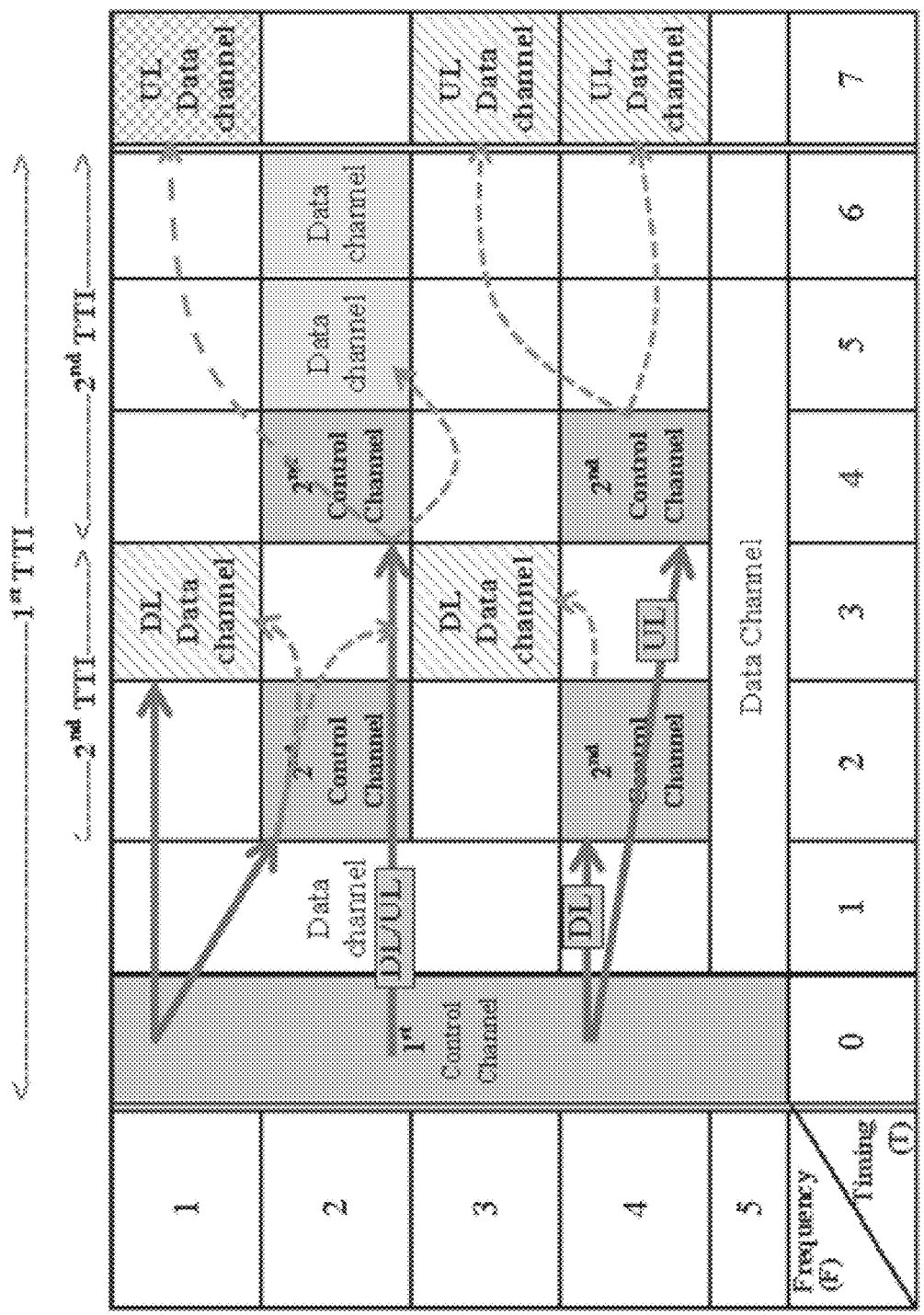
Figure 9:
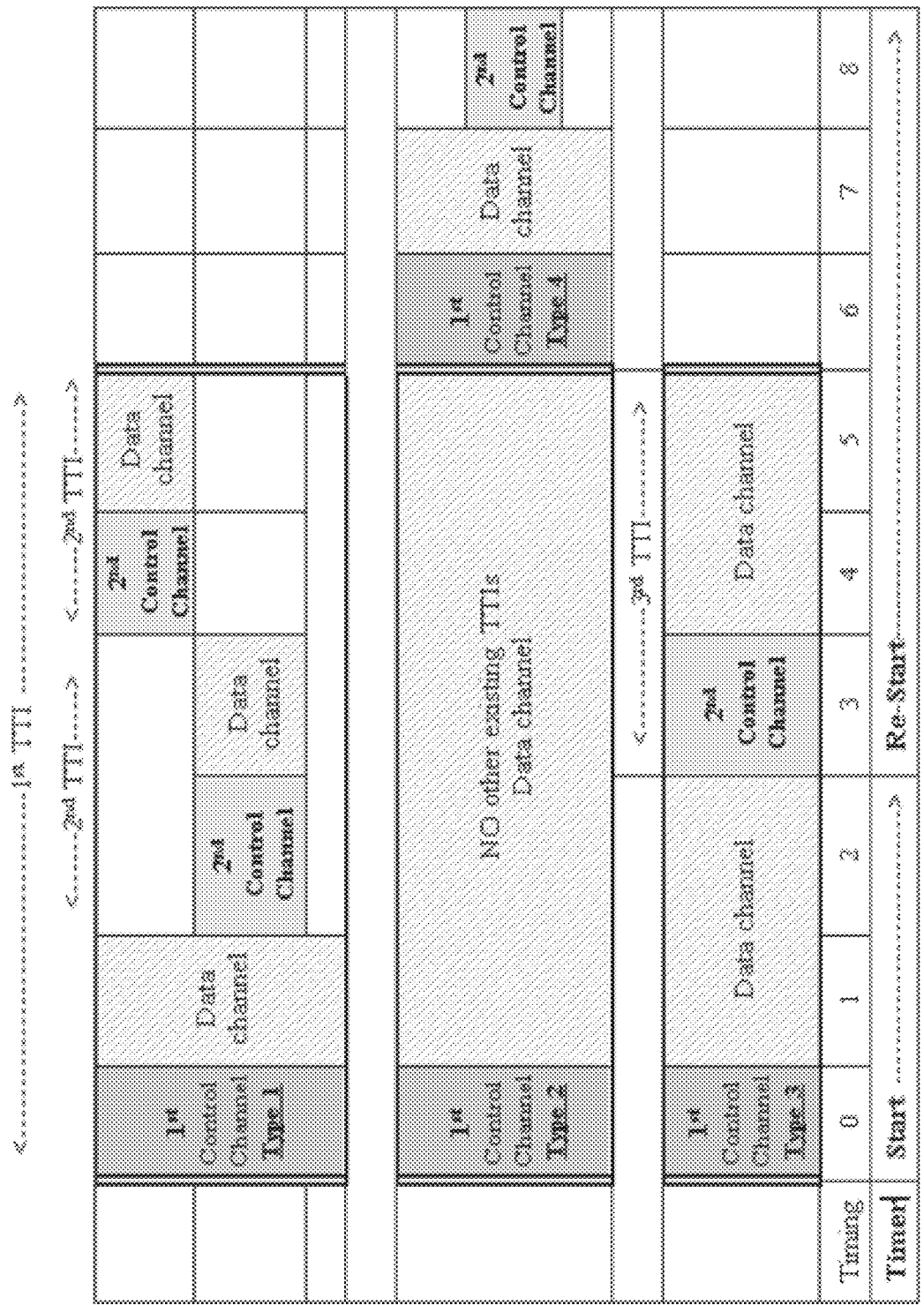
Figure 10:
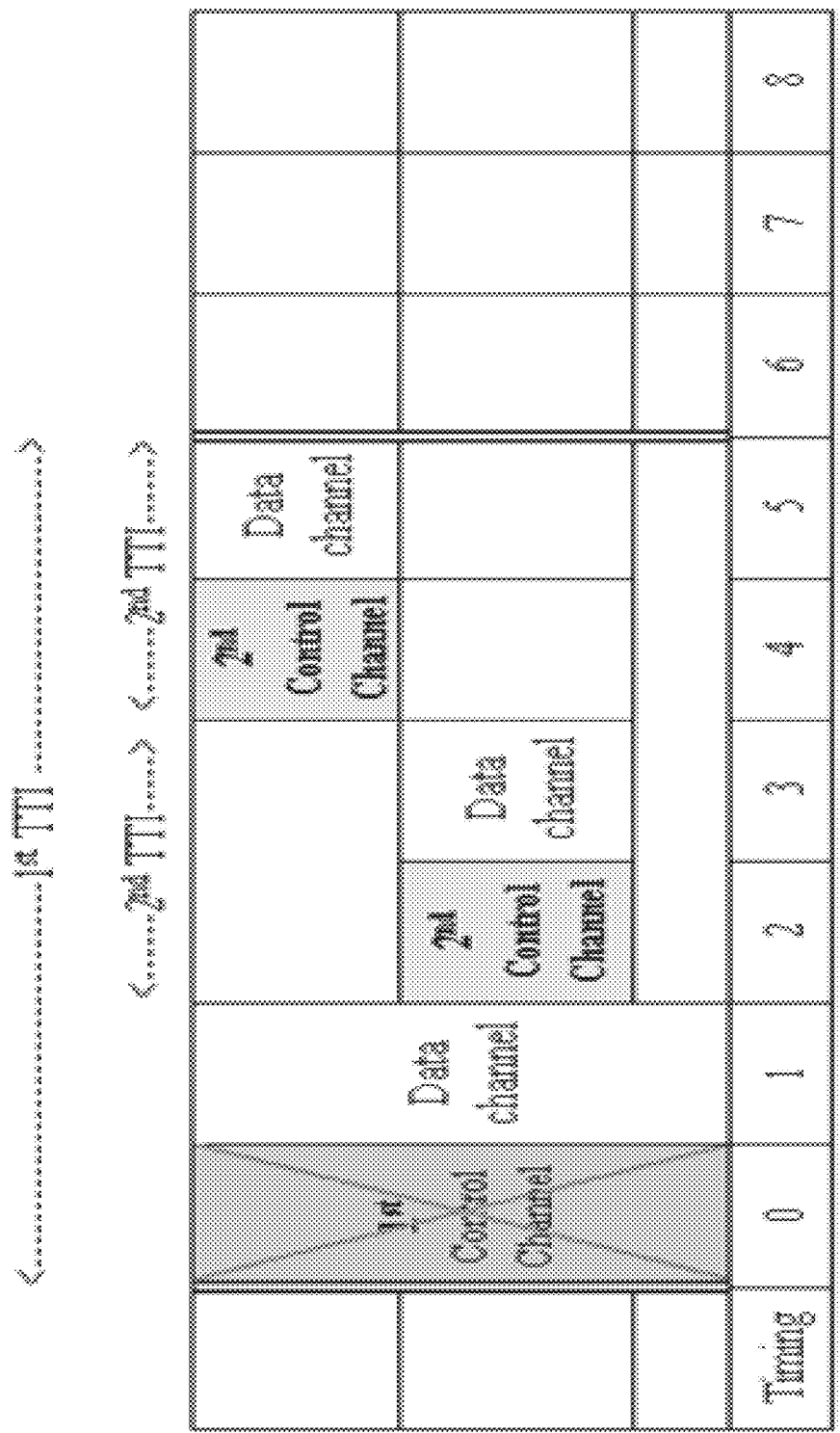
Figure 11:
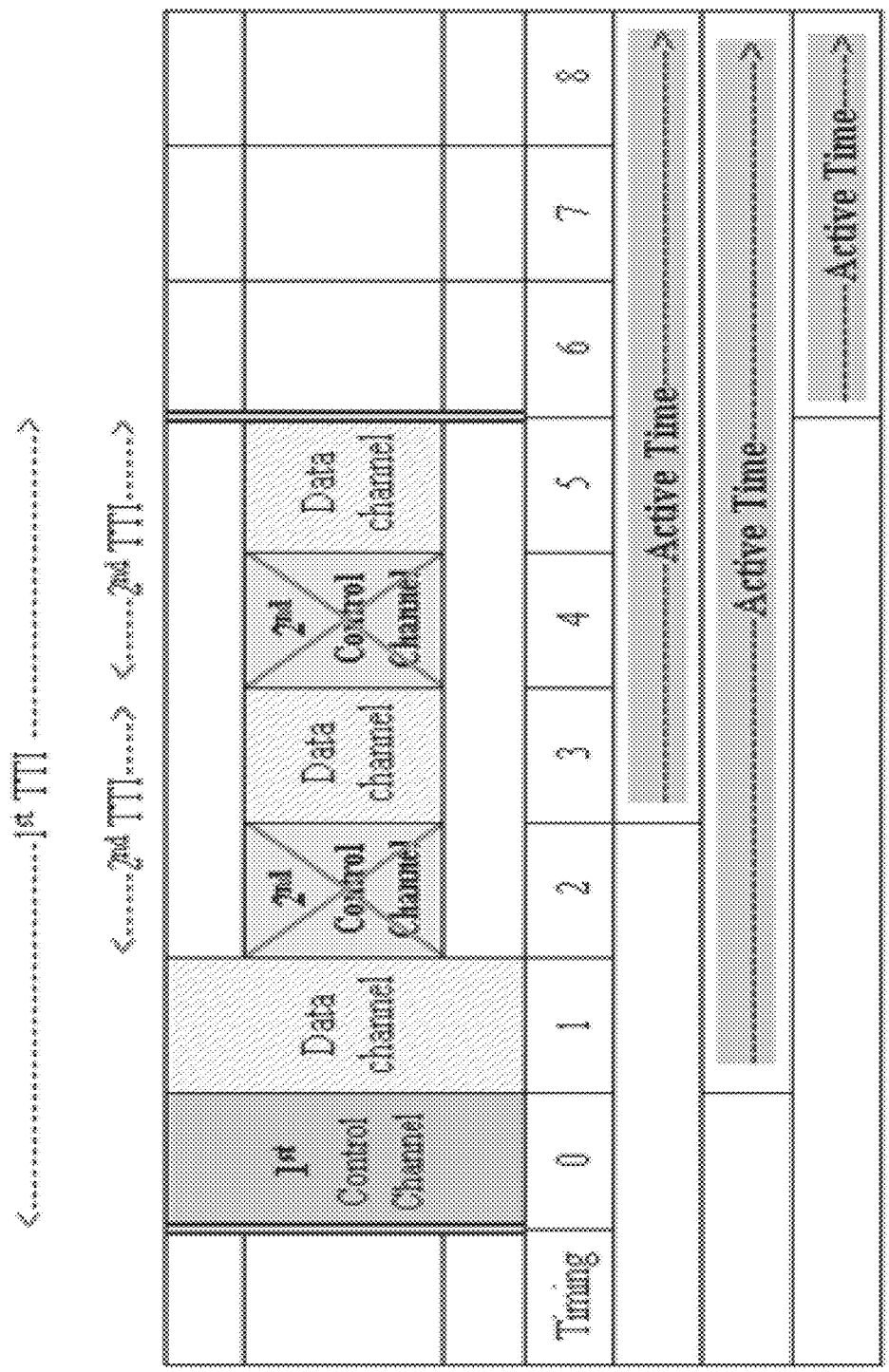

FIG. 8 illustrates an example, non-limiting framework of slow (stage 0) DCI and fast (stage 1) DCI that facilitates detection of control channels with different TTIs in accordance with one or more embodiments described herein. FIG. 9 illustrates an example, non-limiting framework of TTI pattern in slow (stage 0) DCI that facilitates detection of control channels with different TTIs in accordance with one or more embodiments described herein. FIG. 10 illustrates an example, non-limiting framework of a missing slow (stage 0) DCI that facilitates detection of control channels with different TTIs in accordance with one or more embodiments described herein. FIG. 11 illustrates an example, non-limiting framework of a missing fast (stage 1) DCI that facilitates detection of control channels with different TTIs in accordance with one or more embodiments described herein. Repetitive description of like elements employed in other embodiments described herein is omitted for sake of brevity In some embodiments described herein, two or more different transmission time intervals (TTIs) can be employed and two-level DCI can be employed for scheduling of different TTIs. In some embodiments, for example the first level of DCI can be a slow (e.g., stage 0) DCI and the second level of DCI can be a fast (e.g., stage 1) DCI. In some embodiments, mobile device 116 (e.g., DCI component 606 of mobile device 116) can detect both slow DCI and fast DCI to determine how to receive the control channel for the mobile device 116.

In some embodiments, as shown in FIG. 7, the control channel 700 for the mobile device 116 can be a secondary packet data control channel (sPDCCH). In some embodiments, the receive and/or transmit data channel (e.g., physical downlink shared channel (PDSCH), physical uplink shared channel (PUSCH), secondary PDSCH (sPDSCH), and secondary PUSCH (sPUSCH)) can be received by the mobile device 116.

As shown in FIG. 7, in one embodiment, slow DCI can include the 11 bits resource allocation field for reception of data channel and there is no resource allocation field in fast DCI. It may waste too many signalling bits in the slow DCI since DCI is now separated into two parts and the TTI is reduced, which can be mainly used for small packets transmission with low latency. Besides, considering that the data traffic in DL and UL direction can be quite different, it is desired to design a mechanism with more flexibility to handle these different factors between slow and fast DCI, especially for indication of resource information for fast and slow DCI and their corresponding data or control information.

In order to accomplish such, the BS device 100 and the mobile device 116 have the same understanding about how to use different TTIs so that they can receive and/or transmit using the correct time and/or frequency resource. Obviously at least they could communicate with each other by using a first TTI. As for a second TTI, the simplest way is to have a fixed pattern associated with the first TTI. As shown in FIG. 7, there can be four scalable TTI (sTTI) in one subframe. However, it may result in resource wastage since the need of a second TTI may not always exist or can be even quite dynamic.

If one of slow and fast DCI is missing or is not detected by the mobile device 116, the mobile device 116 may not perform any action during the entire subframe/TTI (e.g., 1 ms in LTE system), may not perform any action associated with this TTI, or may not complete a data reception and/or transmission. Since this TTI could carry much control or data information, it could be beneficial for a mobile device 116 to perform one or more action even if some information of this TTI is missing or not detected by the mobile device.

One embodiment of the inventions described herein can employ a Fast/slow DCI for UL/DL directions. For example, normally mobile device 116 needs to detect both slow DCI and fast DCI to transmit or receive control and/or data information. Considering that the smaller packet size can be a typical case for two level DCI scheduling (e.g., slow DCI and fast DCI), the information of resource allocation for fast DCI or the corresponding data/control information can be one of the limited candidates.

Besides, the slow DCI may or may not indicate the traffic direction explicitly or implicitly. If the information of traffic direction is indicated explicitly or implicitly in slow DCI, mobile device 116 can detect some specific resource regions (e.g., specific time and/or frequency in OFDMA system), which means that the control channel 700 of fast DCI for different traffic directions can be separated so that the mobile device 116 may just need to monitor one direction upon reception of slow DCI.

For example, as shown in FIG. 8, the mobile device 116 can receive a slow DCI in Timing 0 and then the mobile device 116 can monitor fast DCI in Timing (T) 2/Frequency (F) 4 for DL traffic or monitor fast DCI in Timing 4/Frequency 4 for UL traffic. FIG. 8 illustrates an example, non-limiting framework of slow (stage 0) DCI and fast (stage 1) DCI that facilitates detection of control channels with different TTIs in accordance with one or more embodiments described herein.

The slow DCI can also indicate traffic for both directions so the mobile device 116 may need to monitor the corresponding fast DCI resource regions for both directions. Having the same timing with different frequencies is also one possibility. These relevant configurations can be known by the mobile device 116 in advance in some embodiments.

In some embodiments, if the information of traffic direction is not indicated in the slow DCI, it can be indicated in the fast DCI. The mobile device 116 can know the corresponding data traffic is for DL or UL through the indication in the fast DCI. For example, as shown in FIG. 8, an information of fast DCI in T4/F2 can indicate the corresponding traffic is for DL in T5/F2 or for UL in T7/F1.

In one embodiment, a method of mobile device 116 of receiving a control channel 700 of different transmission timer intervals (TTIs) in a wireless communication system 200 can be as follows (as also shown and described with reference to method 1500 of FIG. 15). The method can comprise: monitoring a first control channel in the beginning of a first TTI (e.g., via communication component 602); receiving a first downlink control information (DCI) on the first control channel in the first TTI (e.g., via DCI component 606, TTI component 608 and/or control channel component 604), wherein an information of the first DCI indicating a traffic direction of a second TTI associated with a second control channel, and wherein one or more second control channels occurs later than the first control channel and the second TTI is shorter than the first TTI. The method can comprise: determining an information of resource allocation of the control second channel based on the traffic direction (e.g., via control channel component 604); monitoring the second control channel based the information (e.g., via communication component 602); and receiving a second DCI on the second control channel (e.g., via the control channel component 604).

In some embodiments, resource allocation of DL/UL traffic can be facilitated. For example, for DL traffic, the resource allocation can be derived from the resource information of reception of fast DCI like the timing following the fast DCI (until the next second TTI) and the same frequency as fast DCI. For example, as shown in FIG. 8, in the T5/F2, the resource of DL data can be derived from its corresponding fast DCI in T4/F2, which can be T5/F2, T5-T6/F2 or part of them. The other way is to have a less information explicitly in fast DCI to indicate which resource candidate is used for DL traffic data reception. The less information can be just few bits. For example, as shown in FIG. 8, the mobile device 116 receives the fast DCI in T2/F2, the few bits may indicate either [T3/F1] or [T3/F3] as resource of DL traffic; the other possibility of the indication of the few bits is that the frequency is still F2 as the fast DCI but it is divided into several parts like F2-part 1 and F2-part 2.

It can be noted that the timing of data traffic seems to be next to the fast DCI. Therefore, the timing information of data traffic can be indicated explicitly other than the next timing of fast DCI or implicitly the next timing of fast DCI. Actually, it is also applicable for UL traffic by reading few bits to know which UL resource candidate is used for transmission. For example, as shown in FIG. 2, the mobile device receives the fast DCI in T4/F4, the few bits may indicate either [T7/F3] or [T7/F4] as resource of UL traffic.

Both resource allocation of fast DCI and the corresponding data traffic can be indicated in slow DCI. One resource allocation can be used to let mobile device 116 know where to detect fast DCI and the other resource allocation can be used to let mobile device 116 know where to receive the UL/DL data traffic. For example, as shown in FIG. 8, the mobile device 116 detects slow DCI in T0 indicating T2/F2 of fast DCI and also T3/F1 of the traffic. One possibility is that only frequency information of fast DCI and/or data traffic is indicated since the timing between [slow DCI and fast DCI]/[fast DCI and data traffic]/[slow DCI and data traffic] can be implicitly known by the mobile device 116 in advance.

The timing/frequency resource of fast DCI and the corresponding DL traffic can have a tight connection that the timing of traffic is following the fast DCI and their frequency is the same or similar, as shown in sTTI of FIG. 7 or as shown in T4-6/F2 of FIG. 8. In this case, independent timing/frequency resource regions can be used for UL and DL as mentioned above. slow DCI may indicate UL grant of UL data traffic and may not indicate DL resource of DL data traffic.

One embodiment performed by the mobile device 116 of receiving control and data channel in a wireless communication system 200 can be as follows. The method (which is also method 1600 of FIG. 16) can comprise: monitoring a first control channel in the beginning of a first TTI; receiving a first downlink control information (DCI) on the first control channel in the first TTI; determining an information of resource allocation of the DL data channel associated with the first control channel based on resource allocation used for reception of the first control channel; decoding the data channel based the information and the first DCI; and receiving data on the data channel.

An embodiment performed by the mobile device 116 of receiving control channel of different TTIs in a wireless communication system can be as follows. The method (which can also be method 1700 of FIG. 17) can comprise: monitoring a first control channel in the beginning of a first TTI; and receiving a first downlink control information (DCI) on the first control channel in the first TTI. The method can also comprise: monitoring a second control channel associated with a second TTI; and determining one of the following action based on the first DCI. In some embodiments, the method can comprise: decoding a DL data channel associated with the second control channel, wherein the resource allocation of decoding the DL data is not indicated in the first DCI; and transmitting an UL data associated with the second control channel, wherein the UL grant used for transmitting the UL data is indicated in the first DCI.

In some embodiments, the indication of TTI pattern and enabling/disabling second TTI can be employed by mobile device 116. In addition to employing a first TTI, the mobile device 116 can use a second shorter TTI to reduce latency for some urgent data traffic. Normally, the mobile device 116 can be configured to start using second TTI. Considering the assumption of two-level DCI scheduling, the pattern of second TTI can be carried in slow DCI so that mobile device 116 can know how to monitor the second TTI or the status of second TTI.

In some embodiments, using the second TTI can be only valid within a specific period, which can be controlled by a timer 618. The period can be prolonged (e.g., restarting the timer 618) upon detection of scheduling information for the second TTI. For example, as shown in the last row of FIG. 3, the timer 618 can be re-started if the mobile device 116 receives a scheduling information in the Timing 3 for the 3$^{rd}$ TTI.

In another embodiment, a method of the mobile device 116 receiving control channel of different TTIs in a wireless communication system 200. In some embodiments, the method can be method 1200 of FIG. 12. In some embodiments, the method can comprise: monitoring a first control channel in the beginning of a first TTI; receiving a first downlink control information (DCI) on the first control channel in the first TTI, wherein an information of the first DCI indicating a pattern of a second TTI associated with a second control channel, wherein one or more second control channels occurs later than the first control channel and the second TTI is shorter than the first TTI. In some embodiments, the method can also include determining whether and/or how to monitor the second control channel of the second TTI based on the information.

In some embodiments, determining how to monitor the second control channel of the second TTI means to determine in which symbol(s) a UE monitor the second control channel of the second TTI. In various embodiments, the information can be a pattern or a bitmap used to indicate in which symbol(s) the UE monitor the second control channel of the second TTI In some embodiments, the method can also comprise: receiving a second DCI on the second control channel; and performing a defined action based on the second DCI. In various embodiments, one or more of the defined action can be determined and/or performed by action component 612 of mobile device 116.

In some embodiments, the defined action can be one of the following: UL data transmission (e.g., more specifically, the pattern may indicate the TTI of UL data transmission—the pattern can be determined by pattern component 610 of mobile device 116 in some embodiments); DL data reception. More specifically, the pattern may indicate the TTI of DL data reception; UL control information transmission; and/or DL control information reception.

In some embodiments, the pattern component 610 can determine that the pattern can mean no second TTI exists in the following first TTIs. In this case, the mobile device 116 can determine that the second TTI is not used anymore.

In some embodiments, the pattern component 610 can determine that the pattern means the second TTI exists in the following first TTIs. In this case, the mobile device 116 can determine that the second TTI is used.

In some embodiments, the period of having second TTI can be limited. For example, the limited period can be fixed and/or a configured value. As another example, the limited period can be controlled by the timer 618 (and/or a window and/or a counter device). In some embodiments, the period can be extended if the mobile device 116 detects a fast DCI.

In some embodiments when a missing slow DCI or fast DCI is determined, one or more actions can be performed. For example, there are two possibilities that the slow DCI may or may not indicate the resource of sPDCCH for receiving fast DCI. If the mobile device 116 misses one of the slow and fast DCI as shown in FIG. 10 or FIG. 11, mobile device 116 can still try to detect and/or receive another one based on some defined information or performing some defined actions.

Figure 13:
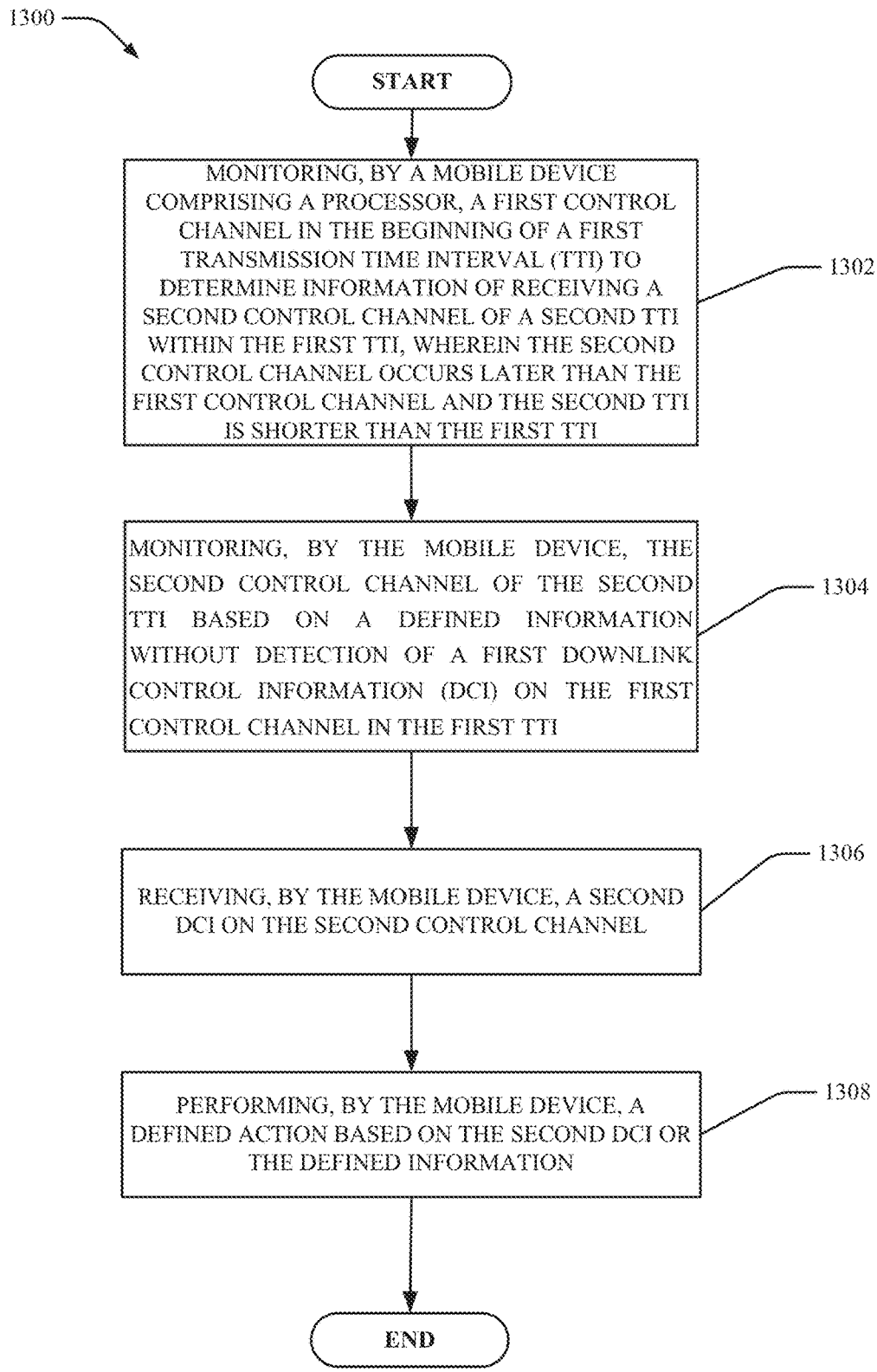

In some embodiments, the slow DCI can be carried by PDCCH or sPDCCH. The fast DCI can be carried by sPDCCH. In some embodiments, a method of a mobile device 116 receiving control channel 700 of different TTIs in a wireless communication system. The method can be as shown in FIG. 13 in some embodiments. The method of the mobile device 116 can comprise: monitoring a first control channel in the beginning of a first TTI so as to know the information of receiving a second control channel of a second TTI within the first TTI, wherein the second control channel occurs later than the first control channel and the second TTI is shorter than the first TTI; monitoring the second control channel of the second TTI based on a defined information without detection of a first downlink control information (DCI) on the first control channel in the first TTI; receiving a second DCI on the second control channel; performing a defined action based on the second DCI and/or the defined information.

In some embodiments, the defined information can be one of the following: (a) the last received DCI on the first control channel or part of the last received DCI; and/or (b) the downlink control information of the last first TTI on the first control channel or part of the downlink control information of the last first TTI. As an example of (a) or (b), the mobile device 116 can assume the same modulation and coding scheme (MCS) or the same scheduling information for the second control channel.

In some embodiments, all potential and/or preconfigured resource locations (e.g., timing and/or frequency) can be configured for the second control channel. For example, there are eight potential decoding (timing and/or frequency) candidates of the second control channel and normally the DCI on the first control channel would indicate which one or more candidates carry the second DCI. If no DCI on the first control channel is received, the mobile device 116 may try to decode all the eight candidates.

Based on the above, the defined action performed by the action component 612 of the mobile device 116 can be one of the following: receiving DL data on a DL data channel; receiving DL control information like TPC; transmitting UL data on a DL data channel; transmitting a UL control information like SRS, channel status report, or random preamble.

Figure 14:
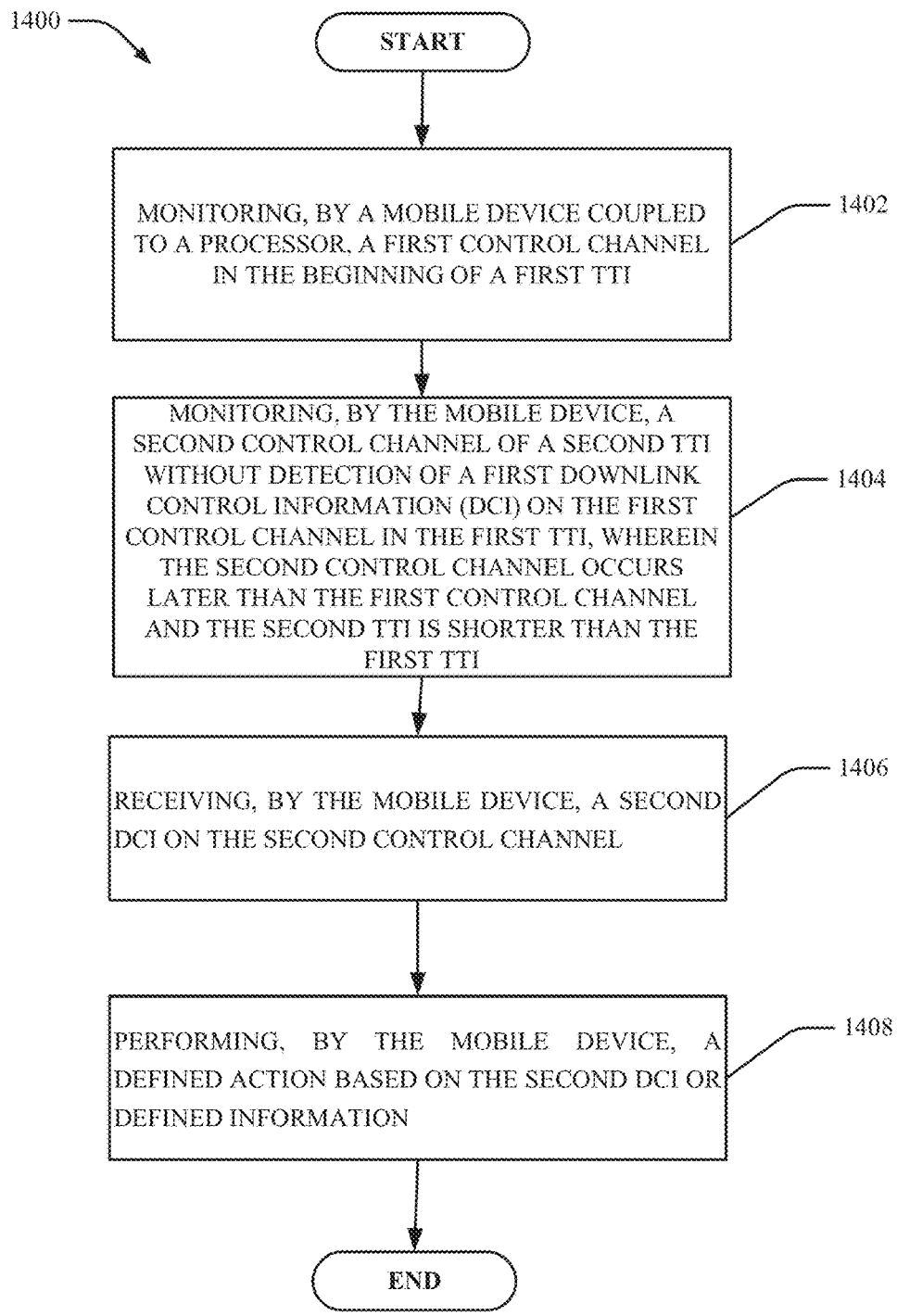

In some embodiments, a method can be performed of receiving control channel of different TTIs in a wireless communication system. The method can be as shown in FIG. 14. In some embodiments, the method can comprise: monitoring a first control channel in the beginning of a first TTI; monitoring a second control channel of the second TTI without detection of a first downlink control information (DCI) on the first control channel in the first TTI, wherein the second control channel occurs later than the first control channel and the second TTI is shorter than the first TTI; receiving a second DCI on the second control channel; performing a defined action based on the second DCI and/or a defined information.

In some embodiments, the defined information can be one of the following: the last received DCI on the first control channel or part of the last received DCI; and/or the DCI of the last first TTI on the first control channel or part of the DCI of the last first TTI.

In some embodiments, the defined action can be one of the following: receiving DL data on a DL data channel; receiving DL control information like TPC based on the second DCI; transmitting UL data on a UL data channel; transmitting a UL control information (e.g., the UL control information can comprise sounding reference signal (SRS), channel status report, or random preamble).

In some embodiments, the method of mobile device 116 receiving control channel of different TTIs in a wireless communication system can be as follows. The method can comprise: monitoring a first control channel in the beginning of a first TTI; receiving a first downlink control information (DCI) on the first control channel in the first TTI; monitoring a second control channel of the second TTI, wherein the second control channel occurs later than the first control channel and the second TTI is shorter than the first TTI; receiving a second DCI on the second control channel; and performing a defined action based on the second DCI and/or a defined information.

In some embodiments, the defined action can be one of the following: considering entering discontinuous reception (DRX) active time, which means to start monitoring the following first control channel (and/or second control channel) within a period. In some embodiments, the period can be controlled and/or implemented by a timer device, window or counter device.

In some embodiments, the period can be started upon detection of the first DCI or from the next first TTI. For example, it is started from the timing 1 or 6 respectively. If the second DCI is detected at the timing 2, the period can be started from the timing 3.

In some embodiments, the first DCI carried on the first control channel at least comprise one of the following information: the resource information of the second control channel and/or the resource information of an UL/DL control and/or data channel associated with the second control channel.

In some embodiments, the first control channel is PDCCH or sPDCCH and the second control channel is sPDCCH. In some embodiments, in any preceding methods described herein, the first DCI can be the slow (e.g., stage 0) DCI and the second DCI can be the fast (e.g., stage 1) DCI.

FIGS. 12, 13, 14, 15 and 16 illustrate example, non-limiting flowcharts of methods facilitating detection of control channels with different TTIs in accordance with one or more embodiments described herein.

Figure 12:
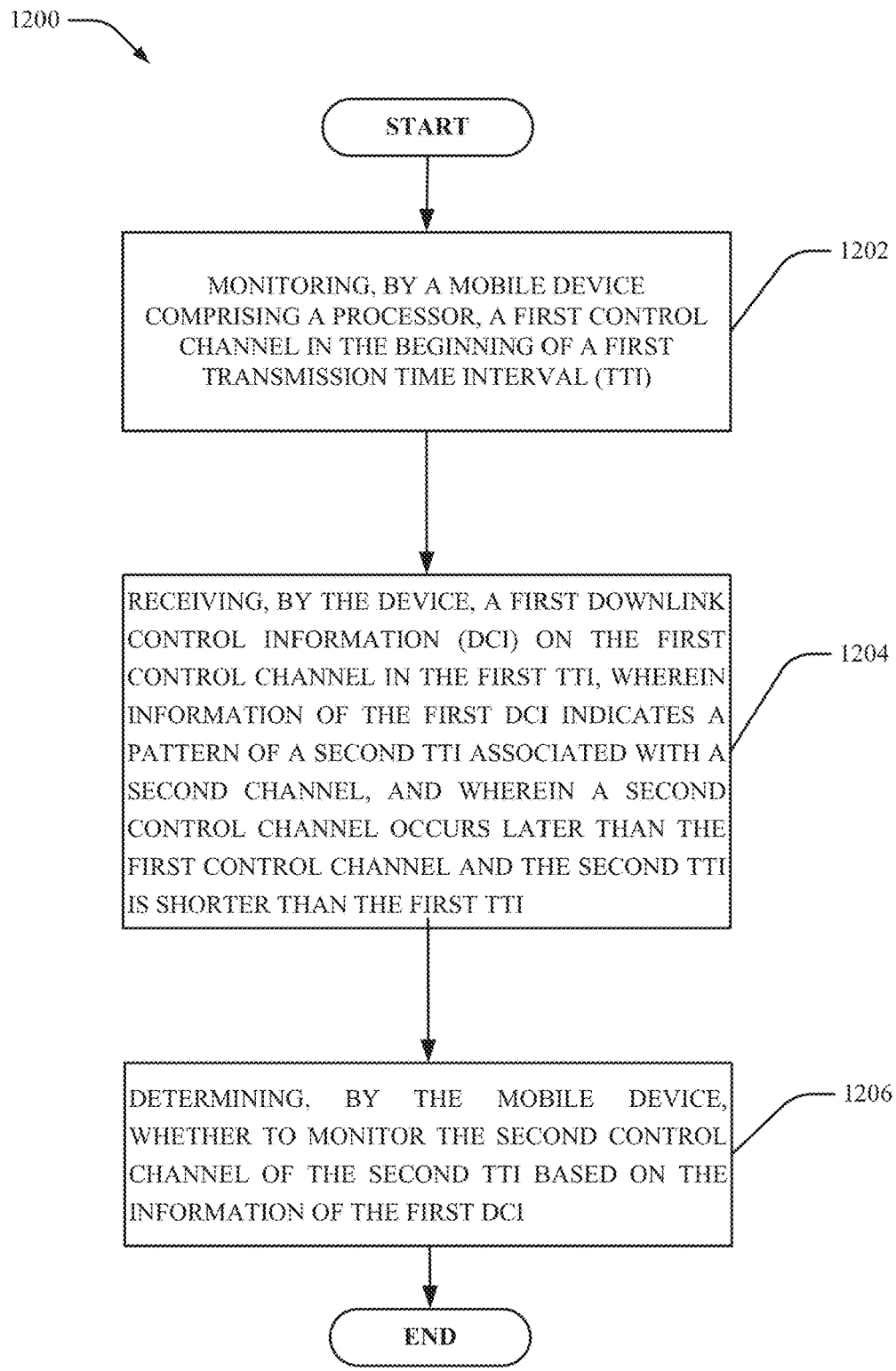

Turning first to FIG. 12, at 1202, computer-implemented method 1200 can comprise monitoring, by a mobile device comprising a processor, a first control channel in the beginning of a first transmission time interval (TTI). At 1204, computer-implemented method 1200 can comprise receiving, by the device, a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI.

In some embodiments, the first control channel is a physical downlink control channel or a secondary physical downlink control channel. In some embodiments, the first DCI is a stage 0 DCI and the second DCI is a stage 1 DCI.

In some embodiments, the pattern of the second TTI indicates no second TTI exists in first TTI, and the computer-implemented method further comprises: determining, by the mobile device, that the second TTI is no longer in use, wherein the determining that the second TTI is no longer in use is based on the pattern of the second TTI indicating no second TTI exists in the first TTI. In some embodiments, the pattern of the second TTI indicates the second TTI exists in the first TTI, and the computer-implemented method further comprises: determining, by the mobile device, that the second TTI is in use, wherein the determining that the second TTI is in use is based on the pattern of the second TTI indicating the second TTI exists in the first TTI.

At 1206, computer-implemented method 1200 can comprise determining, by the mobile device, whether to monitor the second control channel of the second TTI based on the information of the first DCI.

In some embodiments, although not shown, the computer-implemented method can comprise receiving, by the mobile device, a second DCI on the second control channel. The computer-implemented method can also comprise performing a defined action based on the second DCI, wherein the defined action comprises at least one of: an uplink (UL) data transmission, wherein the pattern of the second TTI indicates the TTI of the UL data transmission; downlink (DL) data reception, wherein the pattern of the second TTI indicates the TTI of DL data reception; UL control information transmission; or DL control information reception.

In some embodiments, a period of having the second TTI is limited, wherein the period is at least of: a fixed or configured value; or controlled by a defined timer, a defined window or a counter. In some embodiments, a period of having the second TTI is extended based on detection, by the mobile device, of a third DCI of the first TTI.

Turning now to FIG. 13, at 1302, method 1300 can comprise: monitoring, by a mobile device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI. At 1304, method 1300 can comprise monitoring, by the mobile device, the second control channel of the second TTI based on a defined information without detection of a first downlink control information (DCI) on the first control channel in the first TTI. At 1306, method 1300 can comprise receiving, by the mobile device, a second DCI on the second control channel. At 1308, method 1300 can comprise performing, by the mobile device, a defined action based on the second DCI or the defined information.

In some embodiments, the defined information is at least one of: a last received DCI on the first control channel or part of the last received DCI; the DCI of the last first TTI on the first control channel or part of the DCI of the last first TTI. In some embodiments, the defined information includes all potential or preconfigured resource locations. In some embodiments, the defined action comprises dl control information at least one of receiving DL data on a DL data channel; receiving DL control information; transmitting UL data on a DL data channel; or transmitting UL control information.

In some embodiments, the DL control information comprises transmit power control information. In some embodiments, the UL control information comprises a sounding reference signal, a channel status report or a random preamble.

In some embodiments, the first control channel is a physical downlink control channel or a secondary physical downlink control channel. In some embodiments, the first DCI is a stage 0 DCI and the second DCI is a stage 1 DCI.

Turning now to FIG. 14, at 1402, method 1400 can comprise monitoring, by a mobile device coupled to a processor, a first control channel in the beginning of a first TTI. At 1404, method 1400 can comprise monitoring, by the device, a second control channel of a second TTI without detection of a first downlink control information (DCI) on the first control channel in the first TTI, wherein the second control channel occurs later than the first control channel and the second TTI is shorter than the first TTI.

The first control channel can be a physical downlink control channel or a secondary physical downlink control channel. The first DCI can be the stage 0 DCI and the second DCI can be the stage 1 DCI.

At 1406, method 1400 can comprise receiving, by the device, a second DCI on the second control channel. At 1408, method 1400 can comprise performing, by the device, a defined action based on the second DCI or defined information.

In some embodiments, the defined information is at least one of: a last received DCI on the first control channel or part of the last received DCI; or the DCI of the last first TTI on the first control channel or part of the DCI of the last first TTI. In some embodiments, the defined action is at least one of: receiving DL data on a DL data channel; receiving DL control information like TPC based on the second DCI; transmitting UL data on a UL data channel; or transmitting a UL control information. In some embodiments, the UL control information comprises a sounding reference signal, a channel status report or a random preamble.

Figure 15:
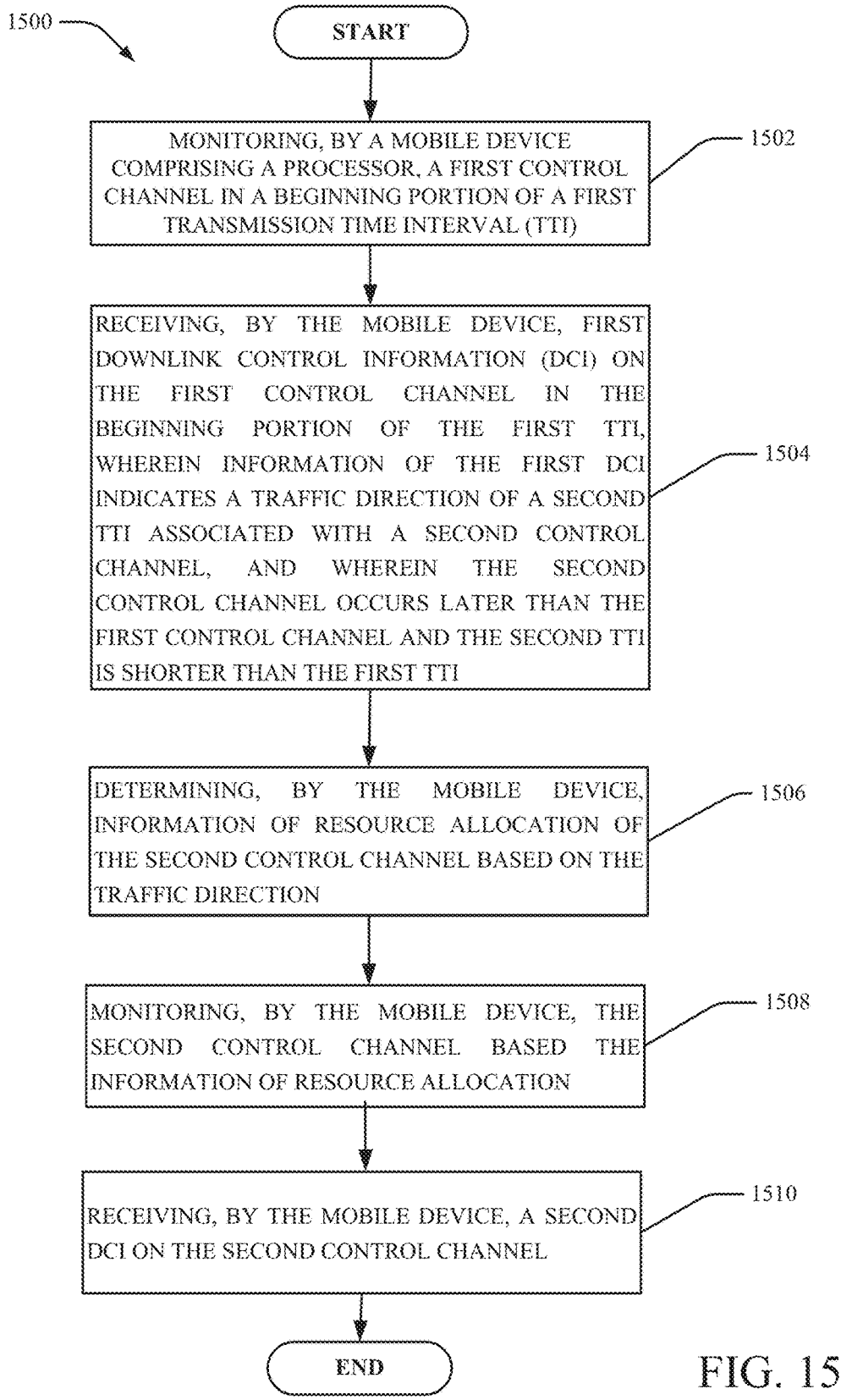

Turning now to FIG. 15, method 1500 can be a method of a mobile device receiving control channel of different TTIs (e.g., first TTI and second TTI) in a wireless communication system. At 1502, method 1500 can comprise monitoring, by a mobile device comprising a processor, a first control channel in a beginning portion of a first transmission time interval (TTI). At 1504, method 1500 can comprise receiving, by the mobile device, first downlink control information (DCI) on the first control channel in the beginning portion of the first TTI, wherein information of the first DCI indicates a traffic direction of a second TTI associated with a second control channel, and wherein the second control channel occurs later than the first control channel and the second TTI is shorter than the first TTI.

At 1506, method 1500 can comprise determining, by the mobile device, information of resource allocation of the second control channel based on the traffic direction. At 1508, method 1500 can comprise monitoring, by the mobile device, the second control channel based the information of resource allocation. At 1510, method 1000 can comprise receiving, by the mobile device, a second DCI on the second control channel.

In some embodiments, the first portion of the first TTI is a beginning portion of the first TTI. In some embodiments, the information of resource allocation is derived from resource information of reception of fast DCI and a same frequency as fast DCI.

In some embodiments, the information of resource allocation can indicate where the mobile device can detect fast DCI. In some embodiments, the information of resource allocation can indicate where the mobile device can receive uplink data traffic and downlink data traffic.

In some embodiments, the first control channel is a physical downlink control channel or a secondary physical downlink control channel. In some embodiments, the first DCI is a stage 0 DCI and the second DCI is a stage 1 DCI.

Figure 16:
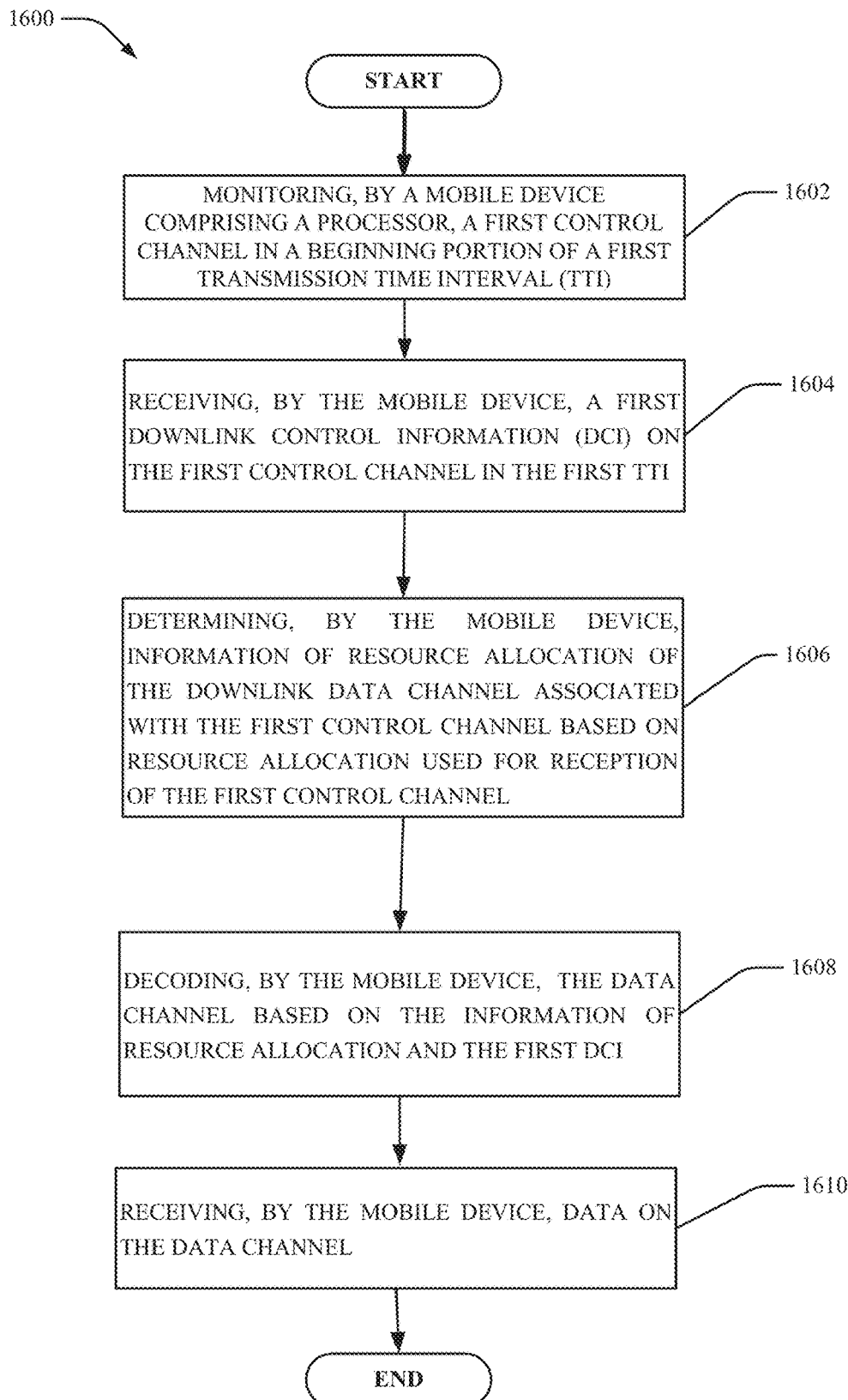

Turning now to FIG. 16, method 1600 can comprise a method of a mobile device receiving control and data channel in a wireless communication system. At 1602, method 1600 can comprise monitoring, by a mobile device comprising a processor, a first control channel in a beginning portion of a first transmission time interval (TTI). At 1604, method 1600 can comprise receiving, by the mobile device, a first downlink control information (DCI) on the first control channel in the first TTI. At 1606, method 1600 can comprise determining, by the mobile device, information of resource allocation of the downlink data channel associated with the first control channel based on resource allocation used for reception of the first control channel. At 1608, method 1600 can comprise decoding, by the mobile device, the data channel based on the information of resource allocation and the first DCI. At 1610, method 1600 can comprise receiving, by the mobile device, data on the data channel.

Figure 17:
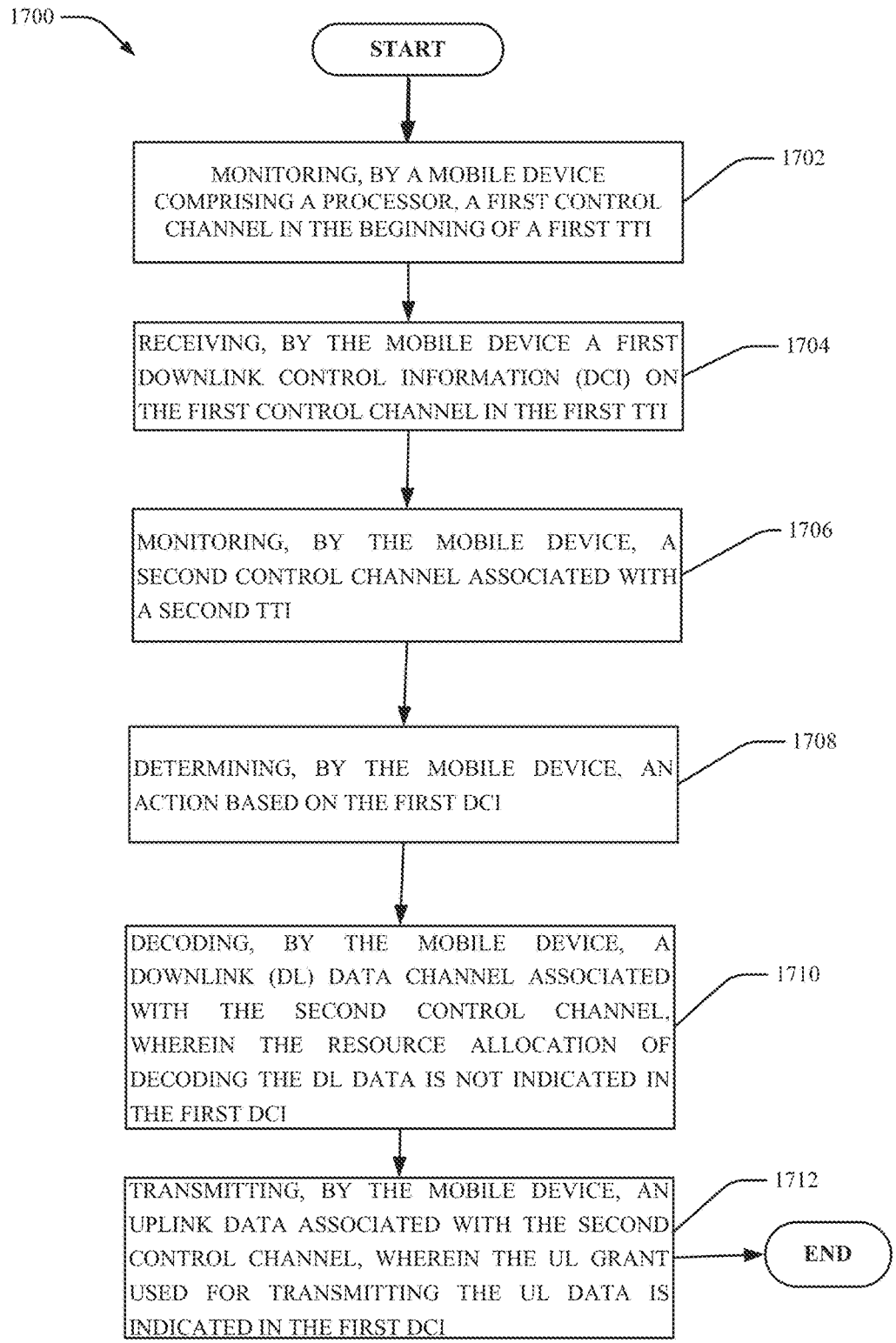

Turning now to FIG. 17, at 1702, method 1700 can comprise monitoring, by a mobile device comprising a processor, a first control channel in the beginning of a first TTI. At 1704, method 1700 can comprise receiving, by the mobile device a first downlink control information (DCI) on the first control channel in the first TTI.

At 1706, method 1700 can monitoring, by the mobile device, a second control channel associated with a second TTI. At 1708, method 1700 can comprise determining, by the mobile device, an action based on the first DCI. At 1710, method 1700 can comprise decoding, by the mobile device, a downlink (DL) data channel associated with the second control channel, wherein the resource allocation of decoding the DL data is not indicated in the first DCI. At 1712, method 1700 can comprise transmitting, by the mobile device, an uplink data associated with the second control channel, wherein the UL grant used for transmitting the UL data is indicated in the first DCI.

Figure 18:
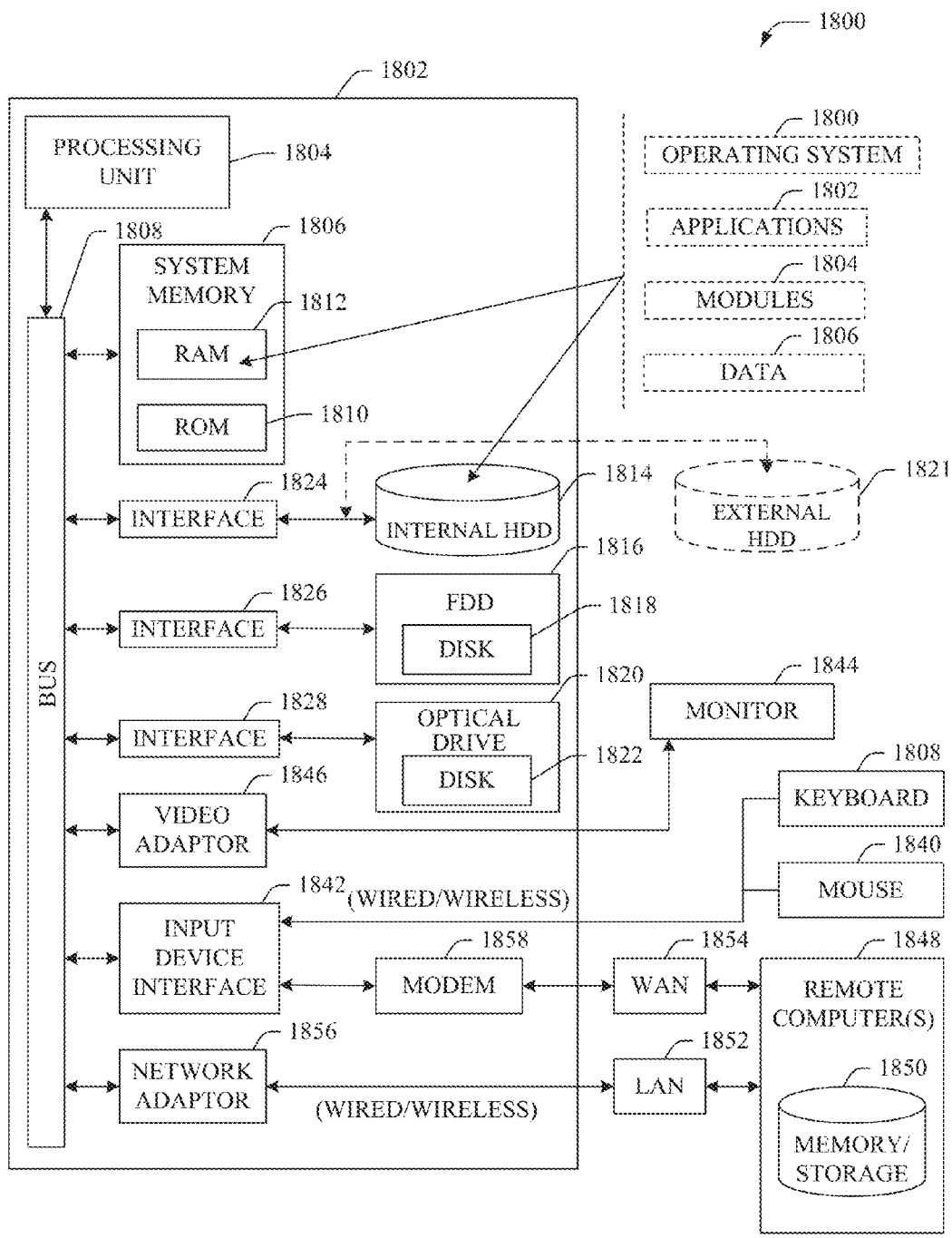

FIG. 18 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 18, the example environment 1800 for implementing various embodiments of the embodiments described herein comprises a computer 1802, the computer 1802 comprising a processing unit 1804, a system memory 1806 and a system bus 1808. The system bus 1808 couples system components comprising, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 comprises ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also comprise a high-speed RAM such as static RAM for caching data.

The computer 1802 further comprises an internal hard disk drive (HDD) 1810 (e.g., EIDE, SATA), which internal hard disk drive 1814 can also be configured for external use in a suitable chassis (not shown), a magnetic floppy disk drive 1816, (e.g., to read from or write to a removable diskette 1818) and an optical disk drive 1820, (e.g., reading a CD-ROM disk 1822 or, to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface, respectively. The interface 1824 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1802, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1812, comprising an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

A mobile device can enter commands and information into the computer 1802 through one or more wired/wireless input devices, e.g., a keyboard 1838 and a pointing device, such as a mouse 1840. Other input devices (not shown) can comprise a microphone, an infrared (IR) remote control, a joystick, a game pad, a stylus pen, touch screen or the like. These and other input devices are often connected to the processing unit 1804 through an input device interface 1842 that can be coupled to the system bus 1808, but can be connected by other interfaces, such as a parallel port, an IEEE 1394 serial port, a game port, a universal serial bus (USB) port, an IR interface, etc.

A monitor 1844 or other type of display device can be also connected to the system bus 1808 via an interface, such as a video adapter 1846. In addition to the monitor 1844, a computer typically comprises other peripheral output devices (not shown), such as speakers, printers, etc.

The computer 1802 can operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically comprises many or all of the elements described relative to the computer 1802, although, for purposes of brevity, only a memory/storage device 1850 is illustrated. The logical connections depicted comprise wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1852 through a wired and/or wireless communication network interface or adapter 1856. The adapter 1856 can facilitate wired or wireless communication to the LAN 1852, which can also comprise a wireless AP disposed thereon for communicating with the wireless adapter 1856.

When used in a WAN networking environment, the computer 1802 can comprise a modem 1858 or can be connected to a communications server on the WAN 1854 or has other means for establishing communications over the WAN 1854, such as by way of the Internet. The modem 1858, which can be internal or external and a wired or wireless device, can be connected to the system bus 1808 via the input device interface 1842. In a networked environment, program modules depicted relative to the computer 1802 or portions thereof, can be stored in the remote memory/storage device 1850. It will be appreciated that the network connections shown are example and other means of establishing a communications link between the computers can be used.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

Various aspects of the disclosure have been described above. It should be apparent that the teachings herein can be embodied in a wide variety of forms and that any specific structure, function, or both being disclosed herein is merely representative. Based on the teachings herein one skilled in the art should appreciate that an aspect disclosed herein can be implemented independently of any other aspects and that two or more of these aspects can be combined in various ways. For example, an apparatus can be implemented or a method can be practiced using any number of the aspects set forth herein. In addition, such an apparatus can be implemented or such a method can be practiced using other structure, functionality, or structure and functionality in addition to or other than one or more of the aspects set forth herein. As an example of some of the above concepts, in some aspects concurrent channels can be established based on pulse repetition frequencies. In some aspects concurrent channels can be established based on pulse position or offsets. In some aspects concurrent channels can be established based on time hopping sequences. In some aspects concurrent channels can be established based on pulse repetition frequencies, pulse positions or offsets, and time hopping sequences.

Those of skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein can be implemented within or performed by an integrated circuit ("IC"), an mobile device, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor can be a microprocessor, but in the alternative, the processor can be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein can be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium can be coupled to a machine such as, for example, a computer/processor (which can be referred to herein, for convenience, as a "processor") such the processor can read information (e.g., code) from and write information to the storage medium. A sample storage medium can be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A computer-implemented method, comprising:
monitoring, by a mobile device comprising a processor, a first control channel in the beginning of a first transmission time interval (TTI);
receiving, by the mobile device, a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and
determining, by the mobile device, whether and in which symbols to monitor the second control channel of the second TTI based on the information of the first DCI.

2. The computer-implemented method of claim 1, further comprising:

receiving, by the mobile device, a second DCI on the second control channel;
performing, by the mobile device, a defined action based on the second DCI, wherein the defined action comprises at least one of: an uplink (UL) data transmission, wherein the pattern of the second TTI indicates the TTI of the UL data transmission; downlink (DL) data reception, wherein the pattern of the second TTI indicates the TTI of DL data reception; UL control information transmission; or DL control information reception.

3. The computer-implemented method of claim 2, wherein the pattern of the second TTI indicates no second TTI exists in first TTI, and wherein the computer-implemented method further comprising:
determining, by the mobile device, that the second TTI is no longer in use, wherein the determining that the second TTI is no longer in use is based on the pattern of the second TTI indicating no second TTI exists in the first TTI.

4. The computer-implemented method of claim 2, wherein the pattern of the second TTI indicates the second TTI exists in the first TTI, and wherein the computer-implemented method further comprising:
determining, by the mobile device, that the second TTI is in use, wherein the determining that the second TTI is in use is based on the pattern of the second TTI indicating the second TTI exists in the first TTI.

5. The computer-implemented method of claim 4, wherein a period of having the second TTI is limited, wherein the period is at least one of: a fixed or configured value; or controlled by a defined timer, a defined window or a defined counter.

6. The computer-implemented method of claim 4, wherein a period of having the second TTI is extended based on detection, by the mobile device, of a third DCI of the first TTI.

7. The computer-implemented method of claim 1, wherein the first control channel is a physical downlink control channel or a secondary physical downlink control channel.

8. The computer-implemented method of claim 2, wherein the first DCI is a stage 0 DCI and the second DCI is a stage 1 DCI.

9. A computer-implemented method, comprising:
monitoring, by a mobile device comprising a processor, a first control channel in the beginning of a first transmission time interval (TTI) to determine information of receiving a second control channel of a second TTI within the first TTI, wherein the second control channel occurs later than the first control channel and the second TTI is shorter than the first TTI;
monitoring, by the mobile device, the second control channel of the second TTI based on defined information without detection of a first downlink control information (DCI) on the first control channel in the first TTI;
receiving, by the mobile device, a second DCI on the second control channel; and
performing, by the mobile device, a defined action based on the second DCI or the defined information.

10. The computer-implemented method of claim 9, wherein the defined information is at least one of: a last received third DCI on the first control channel or part of the third DCI; a fourth DCI of a last first TTI on the first control channel or part of the fourth DCI.

11. The computer-implemented method of claim 9, wherein the defined information comprises all potential or preconfigured resource locations.

12. The computer-implemented method of claim 9, wherein the defined action comprises at least one of receiving DL data on a DL data channel; receiving DL control information; transmitting UL data on a UL data channel; or transmitting UL control information.

13. The computer-implemented method of claim 12, wherein the DL control information comprises transmit power control information.

14. The computer-implemented method of claim 12, wherein the UL control information comprises a sounding reference signal, a channel status report or a random preamble.

15. The computer-implemented method of claim 9, wherein the first control channel is a physical downlink control channel or a secondary physical downlink control channel.

16. The computer-implemented method of claim 9, wherein the first DCI is a stage 0 DCI and the second DCI is a stage 1 DCI.

17. A computer-implemented method, comprising:
monitoring, by a mobile device coupled to a processor, a first control channel in a beginning of a first transmission time interval (TTI);
monitoring, by the device, a second control channel of a second TTI without detection of a first downlink control information (DCI) on the first control channel in the first TTI, wherein the second control channel occurs later than the first control channel and the second TTI is shorter than the first TTI;
receiving, by the device, a second DCI on the second control channel; and
performing, by the device, a defined action based on the second DCI or defined information.

18. The computer-implemented method of claim 17, wherein the defined information is at least one of: a last received third DCI on the first control channel or part of the third DCI; or a fourth DCI of a last first TTI on the first control channel or part of the fourth DCI.

19. The computer-implemented method of claim 17, wherein the defined action is at least one of: receiving DL data on a DL data channel; receiving DL control information like TPC based on the second DCI; transmitting UL data on a UL data channel; or transmitting a UL control information.

20. The computer-implemented method of claim 19, wherein the UL control information comprises a sounding reference signal, a channel status report or a random preamble.

21. The computer-implemented method of claim 17, wherein the first control channel is a physical downlink control channel or a secondary physical downlink control channel.

22. The computer-implemented method of claim 17, wherein the first DCI is a stage 0 DCI and the second DCI is a stage 1 DCI.

23. A mobile device, comprising:
a control circuit;
a processor installed in the control circuit; and
a memory installed in the control circuit and operatively coupled to the processor, wherein the processor is configured to execute a program code stored in memory to perform resource requesting in a wireless communication system by operations comprising:
monitoring a first control channel in the beginning of a first transmission time interval (TTI);
receiving a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and
determining, by the mobile device, whether and in which symbol to monitor the second control channel of the second TTI based on the information of the first DCI.

24. A mobile device, comprising:
a control circuit;
a processor installed in the control circuit; and
a memory installed in the control circuit and operatively coupled to the processor, wherein the processor is configured to execute a program code stored in memory to perform resource requesting in a wireless communication system by operations comprising:
monitoring, by a mobile device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI;
monitoring, by the mobile device, the second control channel of the second TTI based on a defined information without detection of a first downlink control information (DCI) on the first control channel in the first TTI;
receiving, by the mobile device, a second DCI on the second control channel; and
performing, by the mobile device, a defined action based on the second DCI or the defined information.

25. A mobile device, comprising:
a control circuit;
a processor installed in the control circuit; and
a memory installed in the control circuit and operatively coupled to the processor, wherein the processor is configured to execute a program code stored in memory to perform resource requesting in a wireless communication system by operations comprising:
monitoring, by a device coupled to a processor, a first control channel in the beginning of a first TTI;
monitoring, by the device, a second control channel of a second TTI without detection of a first downlink control information (DCI) on the first control channel in the first TTI, wherein the second control channel occurs later than the first control channel and the second TTI is shorter than the first TTI;
receiving, by the device, a second DCI on the second control channel; and
performing, by the device, a defined action based on the second DCI or defined information.

26. A computer-readable storage mobile device storing executable instructions that, in response to execution, cause a system comprising a processor to perform operations, comprising:
monitoring a first control channel in the beginning of a first transmission time interval (TTI);
receiving a first downlink control information (DCI) on the first control channel in the first TTI, wherein information of the first DCI indicates a pattern of a second TTI associated with a second control channel, and wherein the second control channel occurs later than the first control channel and the second TTI is shorter than the first TTI; and determining, by the mobile device, whether to monitor the second control channel of the second TTI based on the information of the first DCI.

27. A computer-readable storage mobile device storing executable instructions that, in response to execution, cause a system comprising a processor to perform operations, comprising:

monitoring, by a device comprising a processor, a first control channel in the beginning of a first transmission time interval (TTI) so as to know the information of receiving a second control channel of a second TTI within the first TTI, wherein the second control channel occurs later than the first control channel and the second TTI is shorter than the first TTI;

monitoring, by the mobile device, the second control channel of the second TTI based on a defined information without detection of a first downlink control information (DCI) on the first control channel in the first TTI;

receiving, by the mobile device, a second DCI on the second control channel; and performing, by the mobile device, a defined action based on the second DCI or the defined information.

28. A computer-readable storage device storing executable instructions that, in response to execution, cause a system comprising a processor to perform operations, comprising:

monitoring a first control channel in the beginning of a first TTI;

monitoring a second control channel of a second TTI without detection of a first downlink control information (DCI) on the first control channel in the first TTI, wherein the second control channel occurs later than the first control channel and the second TTI is shorter than the first TTI;

receiving a second DCI on the second control channel; and performing a defined action based on the second DCI or defined information.

* * * * *